(12) United States Patent
Garth et al.

(10) Patent No.: US 7,813,423 B2
(45) Date of Patent: Oct. 12, 2010

(54) FAST ADAPTIVE TIME DOMAIN HYBRID EQUALIZER FOR TIME REVERSAL-SPACE TIME BLOCK CODE SYSTEM

(75) Inventors: Lee M. Garth, Christchurch (NZ); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 607 days.

(21) Appl. No.: 11/851,760

(22) Filed: Sep. 7, 2007

(65) Prior Publication Data

US 2008/0080612 A1    Apr. 3, 2008

(30) Foreign Application Priority Data

Sep. 28, 2006    (KR) .................. 10-2006-0094595

(51) Int. Cl.
*H03K 5/159*    (2006.01)
*H03H 7/30*    (2006.01)
*H03H 7/40*    (2006.01)

(52) U.S. Cl. ............... 375/233; 375/229; 375/230; 375/231; 375/232; 375/316

(58) Field of Classification Search ........... 375/232, 375/231, 230, 229, 233, 316
See application file for complete search history.

(56) References Cited

U.S. PATENT DOCUMENTS 7,027,497 B2 *    4/2006    Ohmori et al. ............ 375/229
7,092,438 B2 *    8/2006    Rouphael et al. .......... 375/233
7,215,704 B2 *    5/2007    Fujii et al. ................ 375/232
2002/0018529 A1    2/2002    Dabak et al.
2003/0076777 A1    4/2003    Stuber et al.
2005/0063483 A1    3/2005    Wang et al.

FOREIGN PATENT DOCUMENTS

KR    10-2006-0090989 A    8/2006

OTHER PUBLICATIONS

Andre Lima F. De Almeida, et al, "Decoupled Approach for Space-Time Processing with Applications to Joint Detection and MIMO Systems" pp. 1-49.
W.C. Freitas Jr., et al "Interference Cancellation Receiver for Space-Time Block-Coded Systems Over Frequency Selective Channels" GTEL-DETI-CT-UFC C.P. 6005, CEP: 60.455-760, Fortaleza-CE Brazil.
Jonietz et al. "Space-Time Block Coding and Receive Diversity for WLAN IEEE 802.11b" IEEE Conference 2005, IEEE Communications, pp. 2890-2895.
Zhu et al. "Single Carrier Frequency-Domain Equalization With Decision-Feedback Processing for Time-Reversal Space-Time Block Coded Systems" IEEE Transactions on Communcations, vol. 53, No. 7, Jul. 2005, pp. 1127-1131.

(Continued)

*Primary Examiner*—Ted M Wang
(74) *Attorney, Agent, or Firm*—Sughrue Mion, PLLC

(57) ABSTRACT

A fast adaptive time domain equalizer for a Time Reversal-Space Time Block Code (TR-STBC) system is provided. More particularly, a reduced-complexity hybrid Decision Feedback Equalizer (DFE) configuration for the TR-STBC system, and a Least Mean Square (LMS), a normalized LMS (NLMS), and a Recursive Least Square (RLS)-based adaptive algorithms for the hybrid DFE are provided.

15 Claims, 22 Drawing Sheets

OTHER PUBLICATIONS

Mehrotra et al, Time reversal space time block coding with channel estimation errors: Group Research; Dec. 2003, 617-620, 15-18, Tait Electronics Limited, New Zealand.

Geirhofer, Time-Reversal Space-Time Coding for Doubly Selective Channels, School of Electrical and computer engineering, 1638-1643, Cornell University, U.S.

Zhao, Precoding of orthogonal STBC with channel covariance feedback for minimum error probability, Dept of Electrical and Computer Engineering, 503-507, University of Toronto, Canada.

* cited by examiner

FAST ADAPTIVE TIME DOMAIN HYBRID EQUALIZER FOR TIME REVERSAL-SPACE TIME BLOCK CODE SYSTEM

CROSS-REFERENCE TO RELATED APPLICATION

This application claims priority from Korean Patent Application No. 10-2006-0094595, filed on Sep. 28, 2006, in the Korean Intellectual Property Office, the entire disclosure of which is incorporated herein by reference.

BACKGROUND OF THE INVENTION

1. Field of the Invention

Methods and apparatuses consistent with the present invention relate to a fast adaptive time domain equalizer for a Time Reversal-Space Time Block Code (TR-STBC) system.

2. Description of Related Art

The reliability of wireless systems may be improved by using diversity techniques, combined with an equalizer, at a receiver and are to reduce an Inter-Symbol Interference (ISI) caused by a multipath propagation.

A Time Reversal-Space Time Block Code (TR-STBC), which generalizes a STBC method to a frequency selective channel, is known as an efficient transmit diversity technique.

An optimal equalizer for a TR-STBC-based transceiver is a maximum likelihood sequence estimator implemented using a Viterbi algorithm.

However, a Viterbi equalizer may not be implemented in real-time due to the exponential increase in complexity caused by a signal size, the number of antennas, and the length of channel impulse response.

Accordingly, as alternatives, an adaptive Decision Feedback Equalizer (DFE) is considered. Such a DFE requires only linear processing complexity while maintaining an excellent performance.

As a method of removing an ISI from two output streams of a 2×1 TR-STBC decoder, a method of using two single-input single-output (SISO) DFEs, which are independently adapted in parallel, is used.

FIG. 1 is a diagram illustrating a configuration of a 2×1 TR-STBC system using two SISO DFEs independently adapted in parallel in a conventional art.

Two output streams, that is, $z_1(t)$ and $z_2(t)$, which are outputted from a TR-STBC decoder 101 to a first SISO DFE 102A and a second SISO DFE 102B have the same second-order statistics. However, since the first SISO DFE 102A and the second SISO DFE 102B are independently adapted in parallel, the first SISO DFE 102A and the second SISO DFE 102B are uncoupled in terms of input signal statistics.

Also, in the configuration of the equalizer in the conventional art, general algorithms such as a Least Mean Square (LMS) algorithm, a normalized LMS (NLMS) algorithm, a Recursive Least Square (RLS) algorithm, and the like, are used to update tap weights of the equalizer.

However, in the above algorithms in the conventional art, a convergence speed is slow, a long training sequence is required to track a time-varying wireless channel, and a bandwidth efficiency of system is reduced.

Thus, a fast adaptive time domain equalizer for a TR-STBC system is required.

SUMMARY OF THE INVENTION

The present invention provides a hybrid Decision Feedback Equalizer (DFE) configuration used in a Time Reversal-Space Time Block Code (TR-STBC) system and with a reduced complexity, and also provides an adaptive algorithm based on a Least Mean Square (LMS) algorithm, a normalized LMS (NLMS) algorithm, and a Recursive Least Square (RLS) algorithm for the hybrid DFE configuration.

The present invention also provides a new hybrid equalizer configuration in which two single-input single-output (SISO) DFEs have the same tap weights and share statistical information with each other by using the same second-order statistics of two output streams outputted from a TR-STBC decoder to the two SISO DFEs.

According to an embodiment of the present invention, there is provided a hybrid equalizer, including: a first single-input single-output (SISO) Decision Feedback Equalizer (DFE) which receives and processes a first output stream from a time reversal-space time block code (TR-STBC) decoder; and a second SISO DFE which receives and processes a second output stream from the TR-STBC decoder, wherein the first SISO DFE and the second SISO DFE share error information with each other.

In an aspect of the present invention, the first output stream and the second output stream have the same second-order statistical information. Also, the first SISO DFE and the second SISO DFE share the error information with each other to have an equal tap weight using the second-order statistical information.

According to another aspect of the present invention, in the hybrid equalizer, the error information of the first SISO DFE and the second SISO DFE is combined.

According to still another aspect of the present invention, in the hybrid equalizer, the first SISO DFE and the second SISO DFE use any one of a combined error-LMS (CE-LMS) algorithm, a combined error-NLMS (CE-NLMS) algorithm, an averaged estimate-RLS (AE-RLS) algorithm, and a combined estimate-RLS (CE-RLS) algorithm to combine the error information.

According to another embodiment of the present invention, a hybrid equalizer, including: a first multiple-input single-output (MISO) Decision Feedback Equalizer (DFE) which receives and processes a first output stream from a plurality of TR-STBC decoders; and a second MISO DFE which receives and processes a second output stream from the plurality of TR-STBC decoders, wherein the first MISO DFE and the second MISO DFE share error information with each other.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
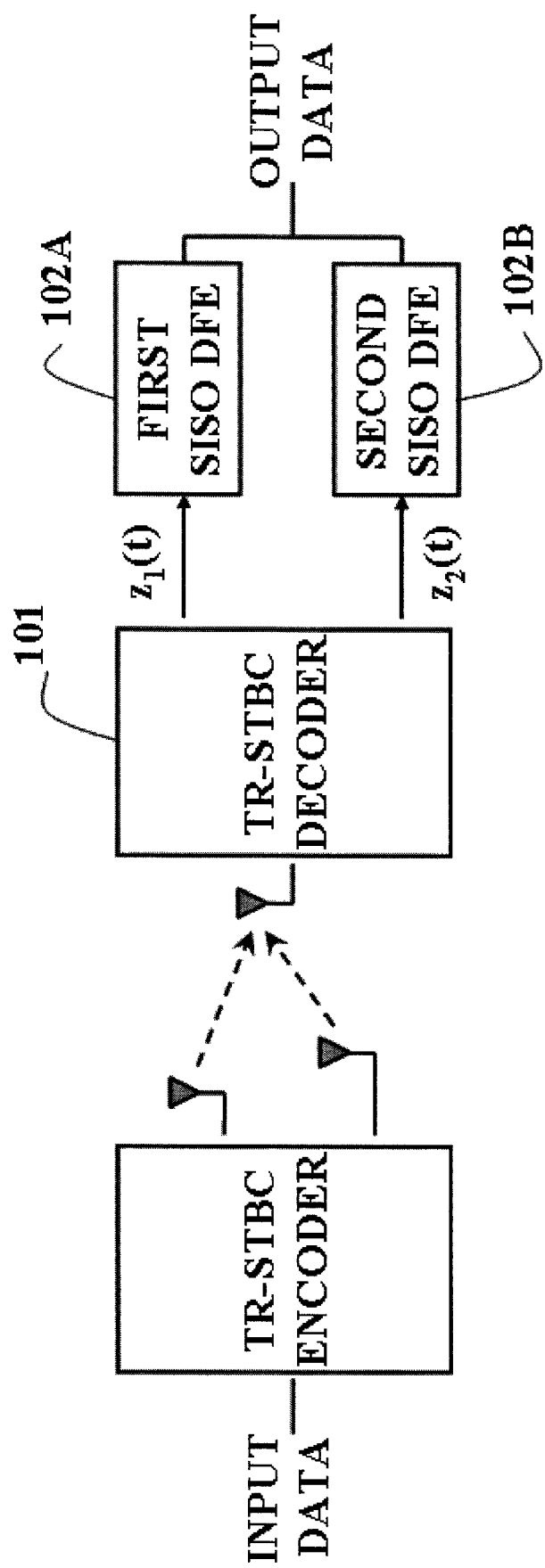
FIG. 1 is a diagram illustrating a configuration of a 2×1 Time Reversal-Space Time Block Code (TR-STBC) system using two single-input single-output (SISO) Decision Feedback Equalizers (DFEs) independently adapted in parallel in a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

I. Background

1. Time Reversal-Space Time Block Code (TR-STBC)

Figure 2:
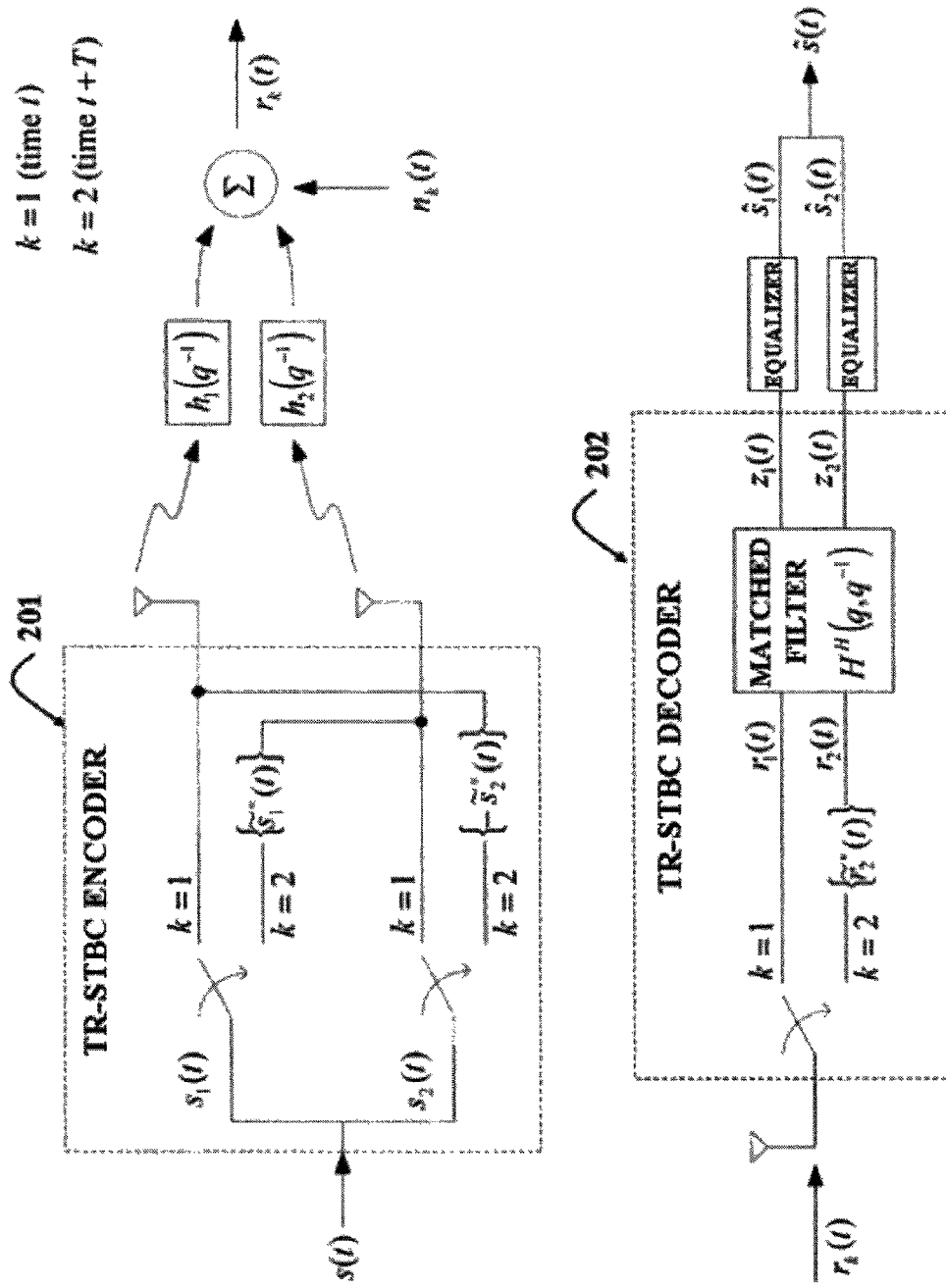
FIG. 2 is a block diagram illustrating a 2×1 TR-STBC system in a conventional art.

FIG. 2 is a block diagram illustrating a 2×1 TR-STBC system in a conventional art.

When a block-based transmission is performed instead of a symbol-based transmission with respect to a frequency selective channel, and a block size corresponds to M, a required data block is represented as, $$s_1(t) = [d_1(0), d_1(1), \ldots, d_1(M-1)] \quad \text{[Equation 1]}$$

$$s_2(t) = [d_2(0), d_2(1), \ldots, d_2(M-1)]$$

$$-\tilde{s}_2^*(t) = [-d_2^*(M-1), -d_2^*(M-2), \ldots, d_2^*(0)]$$

$$\tilde{s}_1^*(t) = [d_1^*(M-1), d_1^*(M-2), \ldots, d_1^*(0)].$$

Here, $d_i(j)$ is a $j^{th}$ symbol of an $i^{th}$ data stream, $\tilde{s}(t)$ denotes a time reversal of $s(t)$. Also, a transmission schedule of the TR-STBC is represented as,

TABLE 1

|          | TX 1            | TX 2           |
|----------|-----------------|----------------|
| Time t   | $s_1(t)$        | $s_2(t)$       |
| Time t + T | $-\tilde{s}_2^*(t)$ | $\tilde{s}_1^*(t)$ |

Both signal components $s_1(t)$ and $s_2(t)$ inputted to a TR-STBC encoder 201, experience a same effective channel, which is represented as, $$g(t) = h_1^*(t)*h_1(t) + h_2^*(t)*h_2(t) \quad \text{[Equation 2]}$$

Here, $h_1(t)$ and $h_2(t)$ are two channel impulse responses.

For an appropriately bandlimited channel, according to a sampling theory, a continuous-time system may be represented using an equivalent discrete-time system without loss of information.

When oversampling continuous-time random processes, that is, $z_1(t)$ and $z_2(t)$, at a P times symbol rate, two outputs of a TR-STBC decoder 202 may be represented as, $$z_1(k) = \sum_{\ell=0}^{\nu} g(k-\ell P)s_1(\ell) + \sum_{\ell=0}^{\nu_h P} h_1^*(\ell-k)n_a(\ell) + \sum_{\ell=0}^{\nu_h P} h_2(k-\ell)n_2^*(-\ell) \quad \text{[Equation 3]}$$

and $$z_2(k) = \sum_{\ell=0}^{\nu} g(k-\ell P)s_2(\ell) + \sum_{\ell=0}^{\nu_h P} h_2^*(\ell-k)n_1(\ell) - \sum_{\ell=0}^{\nu_h P} h_1(k-\ell)n_2^*(-\ell) \quad \text{[Equation 4]}$$

Here, both $h_1(k)$ and $h_2(k)$ have delay spreads which are not greater than a $v_h$ symbol, and v is defined as $v=\lceil(2v_hP-1)/P\rceil=2v_h$.

When stacking an $N_tP$ oversampled observation of $z_1(k)$ and $z_2(k)$ into vectors $z_1$ and $z_2$, respectively, Equation 3 and Equation 4 may be represented in an equivalent matrix-vector which are represented as, $$z_1 = Gs_1 + \tilde{H}_1 n_1 + H_2 \tilde{n}_2, \text{ and} \quad \text{[Equation 5]}$$

$$z_1 = Gs_1 + \tilde{H}_1 n_1 + H_2 \tilde{n}_2. \quad \text{[Equation 6]}$$

Here, a matrix G is an $N_fP \times (N_f+v-1)$ matrix and may be represented as, $$G = \begin{bmatrix} g_1 & g_2 & \ldots & g_v & 0 & \ldots & 0 \\ 0 & g_1 & g_2 & \ldots & g_v & 0 & \vdots \\ \vdots & \ddots & \ddots & \ddots & \ldots & \ddots & \vdots \\ 0 & \ldots & 0 & g_1 & g_2 & \ldots & g_v \end{bmatrix}.$$ [Equation 7]

Here, a length vector P satisfies Equation 8 represented as, $$g_k = [g[(k-1)P+P] \ldots g[(k-1)P+1]]^T.$$ [Equation 8]

A matrix $H_i$ is a standard channel convolution matrix having a size of $N_fP \times (N_f+v-1)$ corresponding to a channel $h_i(t)$, i=1, 2, with a Toeplitz form represented as, $$H_i = \begin{bmatrix} h_i(1) & \ldots & h_i(v_hP) & 0 & \ldots & 0 \\ 0 & h_i(1) & \ldots & h_i(v_hP) & 0 & \vdots \\ \vdots & \ddots & \ddots & \ldots & \ddots & \vdots \\ 0 & \ldots & 0 & h_i(1) & \ldots & h_i(v_hP) \end{bmatrix}.$$ [Equation 9]

Also, a matrix $\tilde{H}_i$ may be formed by replacing the channel $h_i(t)$ with $\tilde{h}_i^*(t)$.

2. Decision Feedback Equalizer (DFE)

Figure 3:
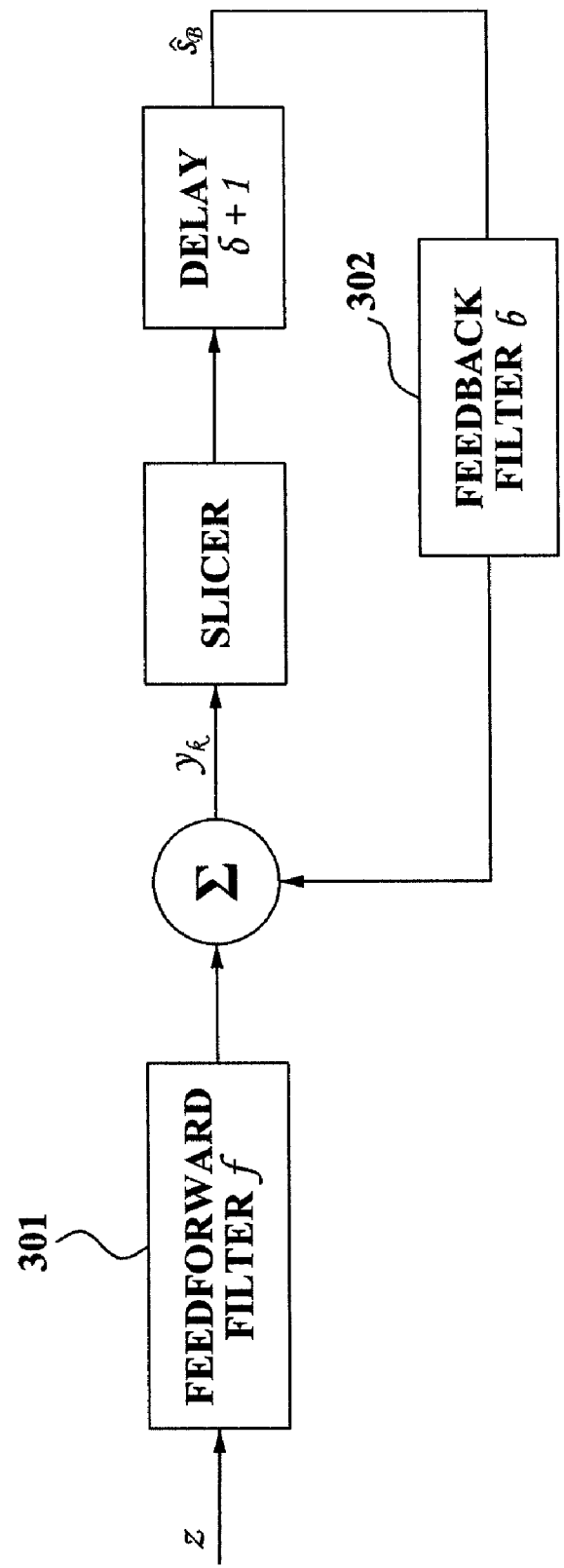
FIG. 3 is a block diagram illustrating a DFE in a conventional art.

FIG. 3 is a block diagram illustrating a DFE in a conventional art.

An optimal maximum likelihood sequence estimator at an output of a TR-STBC decoder may be replaced with a DFE illustrated in FIG. 3. Here, a feedforward filter 301 and a feedback filter 302 have same tap weights as Equation 10, respectively.

$$f=[f_1,f_2,\ldots,f_{N_f}]^T, b=[b_1,b_2,\ldots,b_{N_b}]^T$$ [Equation 10]

During an equalizer training, an actual transmitted symbol $s_k$ corresponding to an equalizer output value is fed back to the feedback filter 302. Accordingly, with respect to an equalizer which desires to recover $s_{k-\delta}$ having a propagation delay $\delta$, a feedback filter 302 data vector $s_B$ is $[s_{k-\delta-1}, s_{k-\delta-2}, \ldots, s_{k-\delta-Nb}]^T$.

A minimum value of a Mean-Square-Error (MSE) J(k) with respect to the tap weights may be represented in a vector form as,

[Equation 11]

$$\min_w J(k) \triangleq \min_w E\{|s_{k-\delta} - w^H v|^2\} = \min_w E\{|e_k|^2\}.$$ [Equation 11]

Here, a vector w(super-observation) and a vector v(super-weight) are respectively represented as, $$w = \begin{bmatrix} f \\ b \end{bmatrix}, v = \begin{bmatrix} z \\ -s_B \end{bmatrix}.$$ [Equation 12]

Also, a feedback filter 302 input vector is $z=[z_k, z_{k-1}, \ldots, z_{k-N_f+1}]^T$, and an estimation error is represented as, $$e_k = s_{k-\delta} - w^H v.$$ [Equation 13]

3. Adaptive Algorithm

Since accurate channel statistics are not actually known, an adaptive algorithm is required to update a filter tap weight.

In a configuration of an equalizer in a conventional art, a general algorithm such as a Least Mean Square (LMS) algorithm, a normalized LMS (NLMS) algorithm, and a Recursive Least Square (RLS) algorithm is used to update a tap weight of an equalizer.

First, the LMS algorithm is represented as, $$w(k+1) = w(k) + \mu e_k^* v(k).$$ [Equation 14]

Here, an error is $e_k = s_{k-\delta} - w^H(k)v(k)$, and $\mu$ is a step-size.

The NLMS algorithm is represented as, $$w_i(k+1) = w_i(k) + \frac{\mu_o}{\|v_i(k)\|^2 + \delta} e_{ik}^* v_i(k)$$ [Euqation 15]

Here, $0<\mu_o<2$ is an adaptation constant, and $0<\delta\ll\sigma_u^2$ is a denominator constant.

The RLS algorithm is represented as,

TABLE 2

| Conventional RLS Algorithm (for i = 1, 2) |
|---|
| Initial conditions: |
| $w_i(0) = 0$ |
| $P_i(0) = \delta^{-1} I$ |
| where $\delta$ is a small positive constant for high SNR |
| To update taps at each iteration, compute |
| $\pi_i(k) = P_i(k-1) v_i(k)$ |
| $k_i(k) = \dfrac{\pi_i(k)}{\lambda + v_i^H(k)\pi_i(k)}$ |
| $\epsilon_{ik} = s_{i,k-\delta} - w_i^H(k-1) v_i(k)$ |
| $w_i(k) = w_i(k-1) + k_i(k)\epsilon_{ik}^*$ |
| $P_i(k) = \lambda^{-1} P_i(k-1) - \lambda^{-1} k_i(k) v_i^H(k) P_i(k-1)$ |

An initial condition of the RLS algorithm and an equation which is required to be calculated to update a tap weight at each iteration are included in Table 2. In the initial condition, $\delta$ is a small constant for a high signal to noise ratio (SNR).

II. Hybrid DFE According to the Present Invention

1. TR-STBC System Configuration Using a Hybrid DFE

As described above with reference to FIG. 1, in a 2×1 TR-STBC system in a conventional art, two output streams, that is, $z_1(t)$ and $z_2(t)$, which are outputted from a TR-STBC decoder 101 to a first SISO DFE 102A and a second SISO DFE 102B have the same second-order statistics. However, since the first SISO DFE 102A and the second SISO DFE 102B are independently adapted in parallel, the first SISO DFE 102A and the second SISO DFE 102B are uncoupled in terms of input signal statistics.

Figure 4:
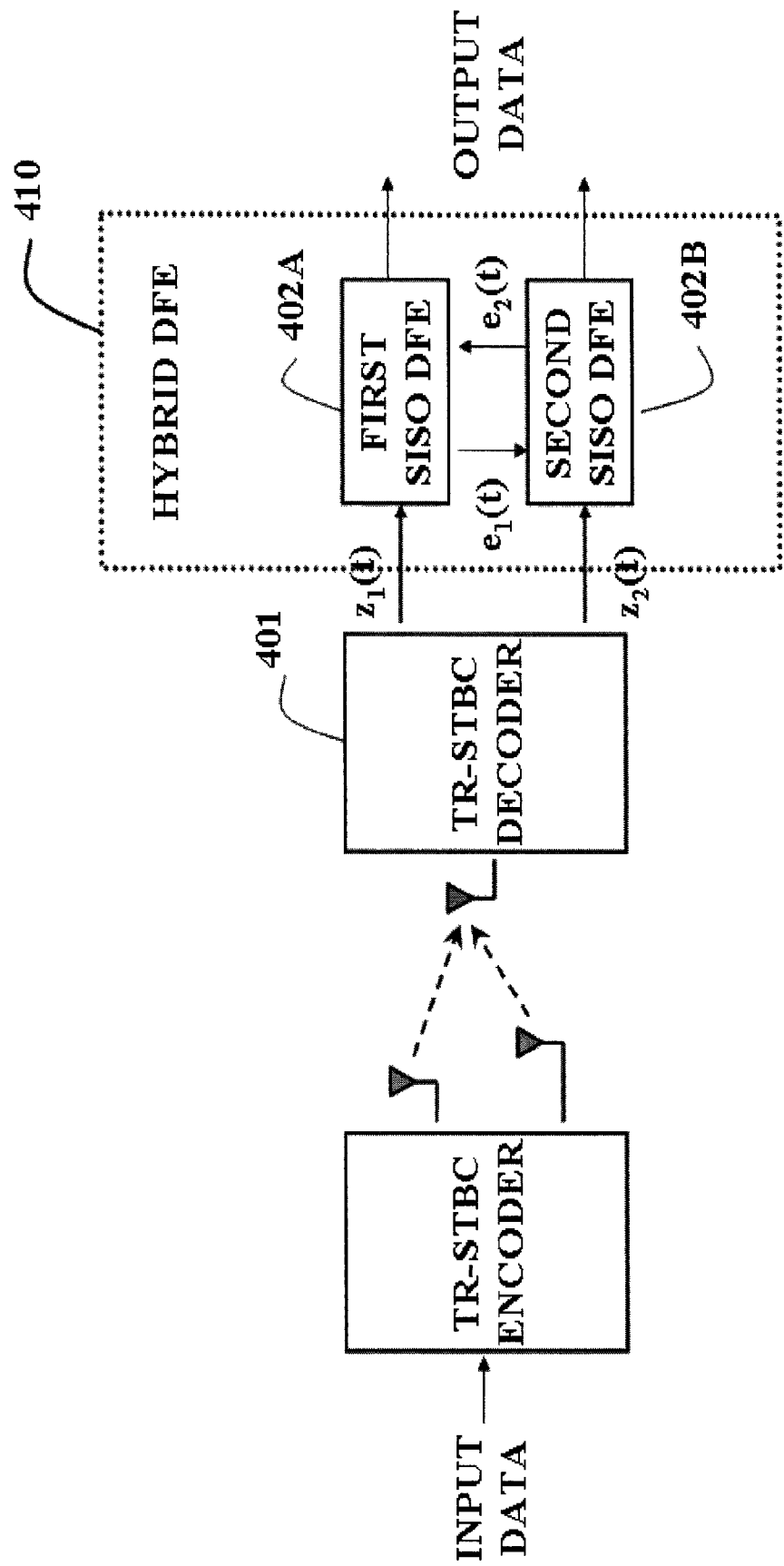
FIG. 4 is a diagram illustrating a 2×1 TR-STBC system using a hybrid DFE according to an exemplary embodiment of the present invention.

FIG. 4 is a diagram illustrating a 2×1 TR-STBC system using a hybrid DFE according to an exemplary embodiment of the present invention.

A first SISO DFE 402A receives a first output stream $z_1(t)$ from a TR-STBC decoder 401. Also, a second SISO DFE 402B receives a second output stream $z_2(t)$ from the TR-STBC decoder 401.

The first SISO DFE 402A and the second SISO DFE 402B share error information $e_1(t)$ and $e_2(t)$ with each other.

As opposed to FIG. 1, a hybrid DFE 410 according to an exemplary embodiment of the present invention has a configuration in which the first SISO DFE 402A and the second SISO DFE 402B share the error information $e_1(t)$ and $e_2(t)$ with each other. Accordingly, a disadvantage of the 2×1 TR-STBC system in the conventional art may be overcome.

The first output stream $z_1(t)$ and the second output stream $z_2(t)$ illustrated in FIG. 4 have the same second-order statistics. Accordingly, minimum Mean-Square-Error (MMSE) Wiener equalizer tap weights are the same for both the first SISO DFE 402A and the second SISO DFE 402B.

Accordingly, the equalizer tap weights are required to be controlled to be equal for the first SISO DFE 402A and the second SISO DFE 402B. For this, the hybrid DFE 410 according to an exemplary embodiment of the present invention combines the error information of the first SISO DFE 402A and the second SISO DFE 402B.

2. Combined Error Adaptive Algorithm

To combine the error information described above, according to the present exemplary embodiment of the present invention, a new adaptive algorithm used in the hybrid DFE 410 is provided. Hereinafter, the new adaptive algorithm is described.

(1) Combined Error-LMS (CE-LMS) Algorithm

For a carrierless amplitude/phase (CAP) equalizer in a digital subscriber line (xDSL) application, output streams of a parallel in-phase equalizer and a quadrature equalizer have the same second-order statistics. In this instance, a modified LMS algorithm to force equalizer tap weights to be equal is given by, $$\overline{w}(k+1) = \overline{w}(k) + \mu[e_{Ik}u_I(k) + e_{Qk}u_Q(k)] \quad \text{[Equation 16]}$$
$$e_{Ik} = a_{k-\delta} - \overline{w}^T(k)u_I(k)$$
$$e_{Qk} = b_{k-\delta} - \overline{w}^T(k)u_Q(k)$$

Here, $a_k$ denotes a real part of transmitted symbols and $b_k$ is an imaginary part of the transmitted symbols. Also, vectors $u_I(k)$ and $u_Q(k)$ contain in-phase and quadrature observations in tap delay lines.

According to an exemplary embodiment of the present invention, as an algorithm generalizing the modified LMS algorithm represented as Equation 16 with complex equalizer taps, the CE-LMS algorithm is given by, $$\overline{w}(k+1) = \overline{w}(k) + \mu[e_{1k}^* v_1(k) + e_{2k}^* v_2(k)], \quad \text{[Equation 17]}$$

where $v_1(k)$ and $v_2(k)$ are tap input vectors, and errors are represented as, $$e_{1k} = s_{1,k-\delta} - \overline{w}^H(k)v_1(k)$$
$$e_{2k} = s_{2,k-\delta} - \overline{w}^H(k)v_2(k). \quad \text{[Equation 18]}$$

The CE-LMS algorithm converges faster to a lower steady-state than a conventional LMS algorithm, which will be described using simulations.

(2) Combined Error-NLMS (CE-NLMS) Algorithm

It is required to speed up a convergence with respect to a time-varying wireless channel in order to decrease a length of a training sequence and improve an equalizer tracking performance.

For this, according to an exemplary embodiment of the present invention, the CE-NLMS and CE-RLS algorithm are provided. First, the CE-NLMS according to an exemplary embodiment of the present invention is described.

$$\overline{w}(k+1) = \quad \text{[Equation 19]}$$
$$\overline{w}(k) + \frac{\mu_o}{\|u_1(k)\|^2 + \delta} e_{1k}^* u_1(k) + \frac{\mu_o}{\|u_2(k)\|^2 + \delta} e_{2k}^* u_2(k)$$

Here, errors are the same as the errors defined in Equation 18.

(3) Averaged Estimate-RLS (AE-RLS) Algorithm

The AE-RLS algorithm according to an exemplary embodiment of the present invention is provided. The AE-RLS algorithm may be obtained by averaging RLS parameters, and represented as,

TABLE 3

Averaged Estimate-RLS Algorithm

Initial conditions:

$$w_{AE}(0) = 0$$
$$P_{AE}(0) = \delta^{-1} I$$

where $\delta$ is a small positive constant for high SNR
To update taps at each iteration, compute $$\pi_1(k) = P_{AE}(k-1) v_1(k) \qquad \pi_2(k) = P_{AE}(k-1) v_2(k)$$

$$k_1(k) = \frac{\pi_1(k)}{\lambda + v_1^H(k) \pi_1(k)} \qquad k_2(k) = \frac{\pi_2(k)}{\lambda + v_2^H(k) \pi_2(k)}$$

$$\epsilon_{1k} = s_{1,k-\delta} - w_{AE}^H(k-1) v_1(k) \qquad \epsilon_{2k} = s_{2,k-\delta} - w_{AE}^H(k-1) v_2(k)$$

$$w_{AE}(k) = w_{AE}(k-1) + \frac{1}{2}[k_1(k) \epsilon_{1k}^* + k_2(k) \epsilon_{2k}^*]$$

$$P_{AE}(k) = \lambda^{-1} P_{AE}(k-1) - \frac{1}{2\lambda}[k_1(k) v_1^H(k) + k_2(k) v_2^H(k)] P_{AE}(k-1)$$

In Table 3, initial conditions of the AE-RLS algorithm and equations to be calculated to update tap weights at each iteration are provided. In the initial condition, $\delta$ is a small constant for a high SNR.

(4) Combined Estimate-RLS (CE-RLS) Algorithm

The CE-RLS algorithm according to an exemplary embodiment of the present invention is provided. The CE-RLS algorithm may be obtained by generating combined estimates of RLS parameters, and represented as,

TABLE 4

Combined Estimate-RLS Algorithm

Initial conditions:
$w_{CE}(0) = 0$
$P_{CE}(0) = \delta^{-1} I$
where $\delta$ is a small positive constant for high SNR
To update taps at each iteration, compute
$\Pi(k) = P_{CE}(k-1) V(k)$
where $V(k) = [v_1(k) \, v_2(k)]$
$K(k) = \Pi(k) [\lambda I_2 + V^H(k) \Pi(k)]^{-1}$ $\epsilon(k) = s(k) - V^T(k) w_{CE}^*(k-1)$ where $s(k) = [s1, k - \delta \, s2, k - \delta]^T$
$w_{CE}(k) = w_{CE}(k-1) + K(k) \epsilon^*(k)$
$P_{CE}(k) = \lambda^{-1} P_{CE}(k-1) - \lambda^{-1} K(k) V^H(k) P_{CE}(k-1).$ In Table 4, initial conditions of the CE-RLS algorithm and equations to be calculated to update tap weights at each iteration are provided. In the initial condition, $\delta$ is a small constant for a high SNR.

According to an exemplary embodiment of the present invention, since the first SISO DFE 402A and the second SISO DFE 402B, that is, the two equalizers of the hybrid DFE 410, share the error information with each other, the CE-RLS algorithm may converge faster than a conventional RLS algorithm, which will be described using simulations.

Figure 5:
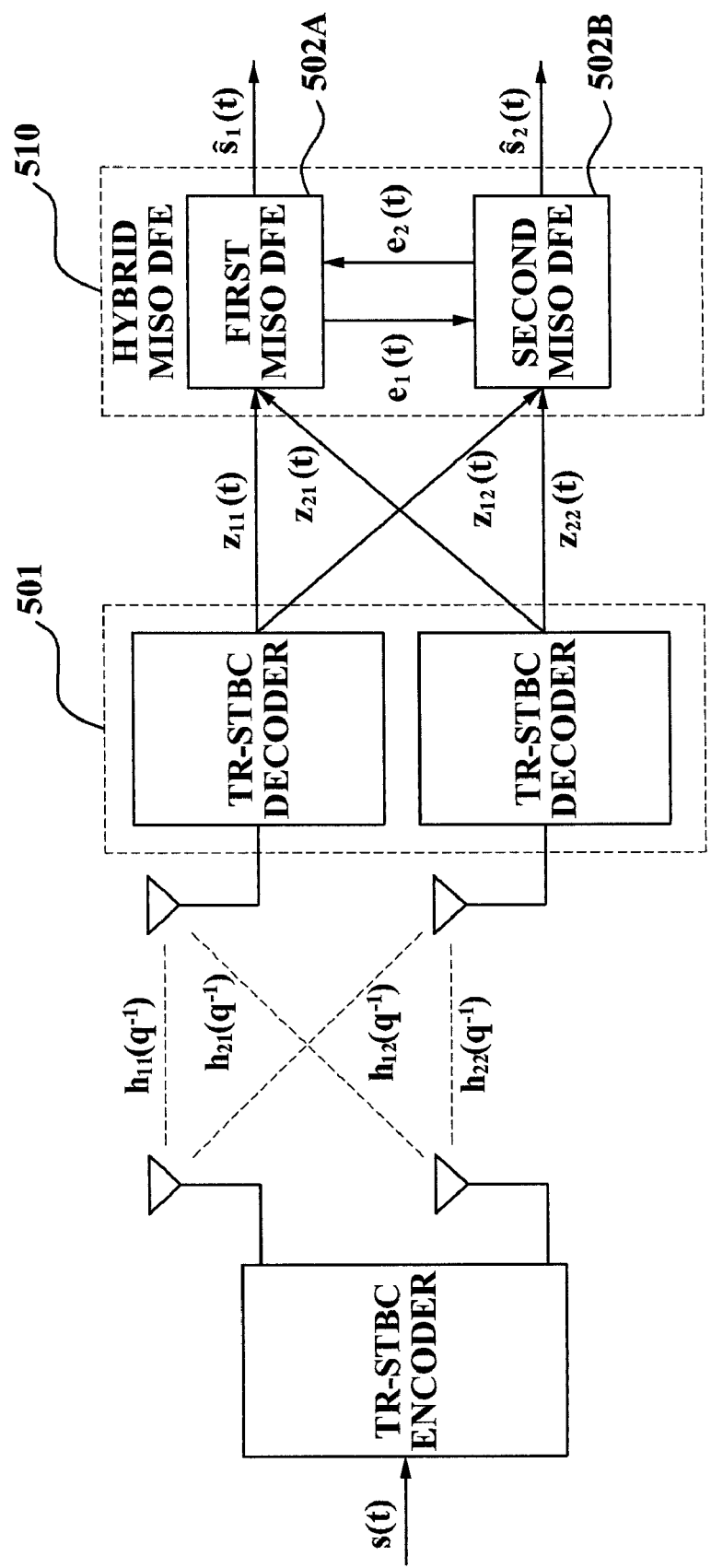
FIG. 5 is a diagram illustrating a 2×2 TR-STBC system using a hybrid multiple-input single-output (MISO) DFE according to an exemplary embodiment of the present invention.

3. TR-STBC System Configuration Using Hybrid Multiple-Input Single-Output (MISO) DFE FIG. 5 is a diagram illustrating a 2×2 TR-STBC system using a hybrid MISO DFE according to an exemplary embodiment of the present invention.

A first MISO DFE 502A receives first output streams, that is, $z_{11}(t)$ and $z_{21}(t)$, from a plurality of TR-STBC decoders 501. Also, a second MISO DFE 502B receives second output streams, that is, $z_{12}(t)$ and $z_{22}(t)$, from the plurality of TR-STBC decoders 501.

The first MISO DFE 502A and the second MISO DFE 502B share error information $e_1(t)$ and $e_2(t)$ with each other.

A hybrid MISO DFE 510 according to an exemplary embodiment of the present invention has a configuration in which the first MISO DFL 502A and the second MISO DFE 502B share the error information $e_1(t)$ and $e_2(t)$ with each other. Accordingly, a disadvantage in a conventional art may be overcome.

The first output streams, that is, $z_{11}(t)$ and $Z_{21}(t)$, and the second output streams, that is, $z_{12}(t)$ and $z_{22}(t)$ illustrated in FIG. 5, have the same second-order statistics. Accordingly, optimal MMSE Wiener equalizer tap weights are the same for both the first MISO DFE 502A and the second MISO DFE 502B.

Accordingly, equalizer tap weights are required to be controlled to be equal for the first MISO DFE 502A and the second MISO DFE 502B. For this, the hybrid MISO DFE 510 according to an exemplary embodiment of the present invention combines the error information of the first MISO DFE 502A and the second MISO DFE 502B.

To combine the error information as described above, the hybrid MISO DFE 510 may use any one of the above-described CE-LMS algorithm, the CE-NLMS algorithm, the AE-RLS algorithm, and the CE-RLS algorithm.

Also, as illustrated in FIG. 5, the hybrid MISO DFE 510 may be generalized by replacing two SISO DFEs in FIG. 4 with the two MISO DFEs 502A and 502B. Accordingly, when an RX antenna is introduced, a fast convergence speed may be maintained and an RX diversity feature may be used through a hybrid MISO equalizer configuration using the hybrid algorithm according to an exemplary embodiment of the present invention.

Figure 6:
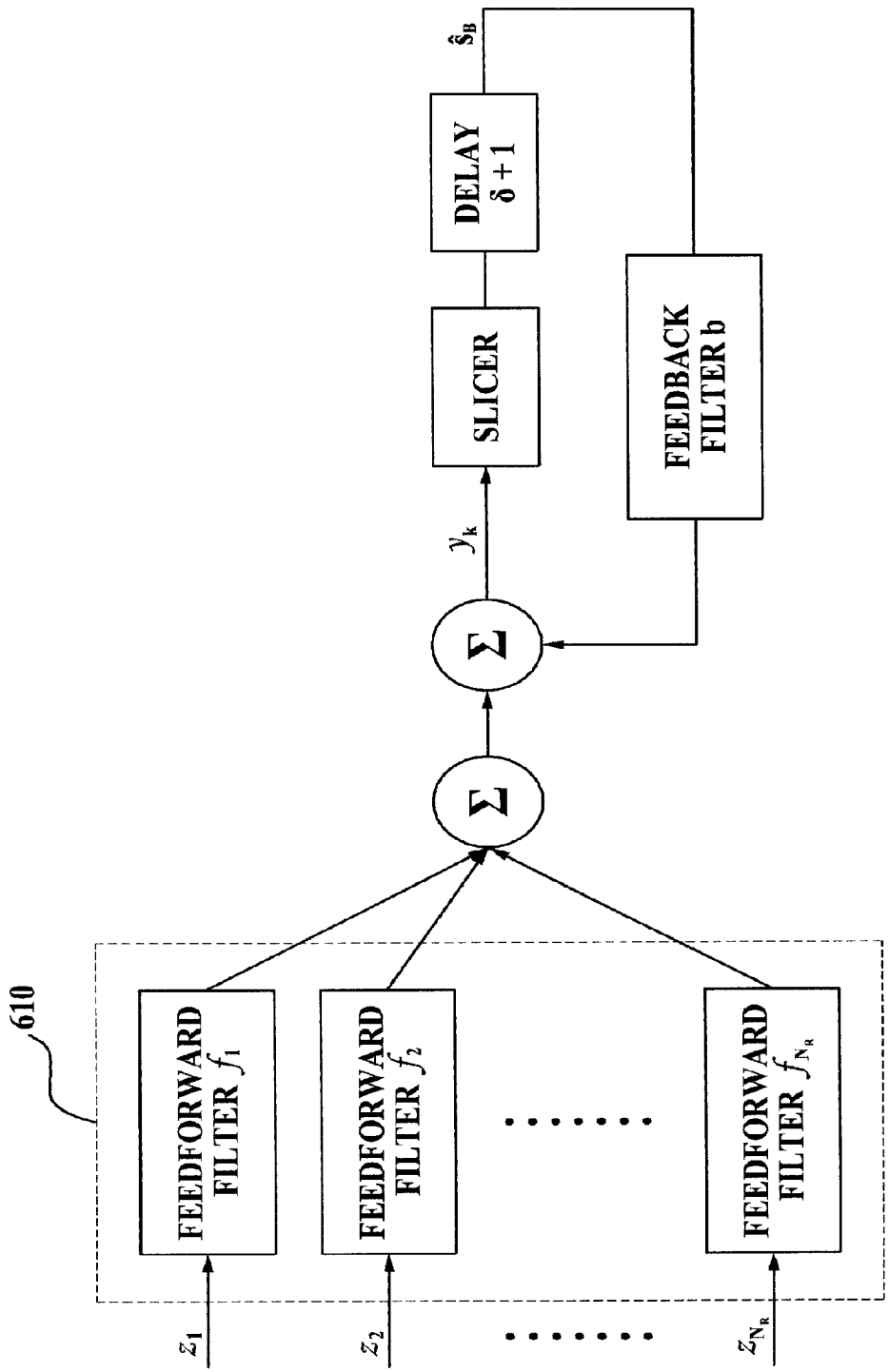
FIG. 6 is a block diagram illustrating a MISO DFE according to an exemplary embodiment of the present invention.

FIG. 6 is a block diagram illustrating a MISO DFE according to an exemplary embodiment of the present invention.

As illustrated in FIG. 6, the MISO DFE 610 includes an NR number of receive antennas as opposed to a SISO DFE, to improve diversity gains of the TR-STBC system.

For the MISO-DFE, the vector w(super-observation) and the vector V(super-weight) described above is required to be replaced with, $$\check{w} = \begin{bmatrix} f_1 \\ \vdots \\ f_{N_R} \\ b \end{bmatrix} \triangleq \begin{bmatrix} \check{f} \\ b \end{bmatrix}, \check{u} = \begin{bmatrix} z_1 \\ \vdots \\ z_{N_R} \\ -s_B \end{bmatrix} \triangleq \begin{bmatrix} \check{z} \\ -s_B \end{bmatrix}.$$ [Equation 20]

III. Simulation Results

Figure 7A:
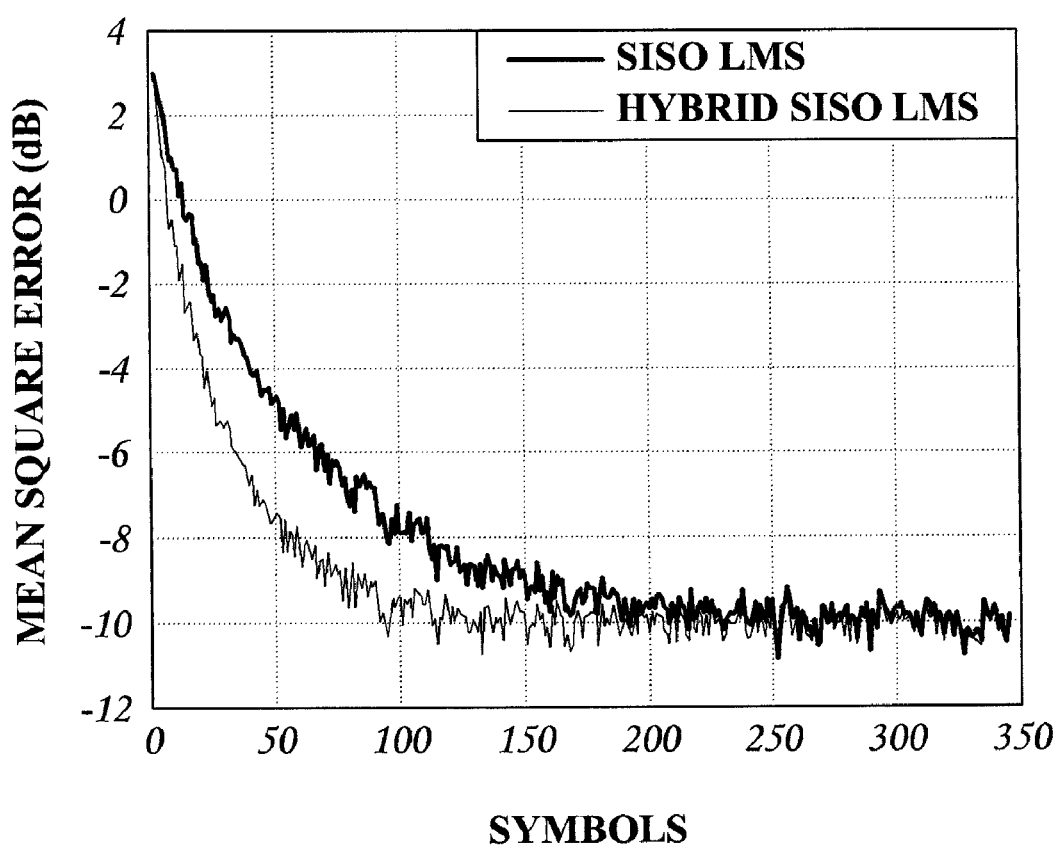
FIGS. 7A and 7B are graphs illustrating simulation results comparing performances of a SISO equalizer in a conventional art and a hybrid equalizer according to an exemplary embodiment of the present invention in a fixed channel.
Figure 7B:
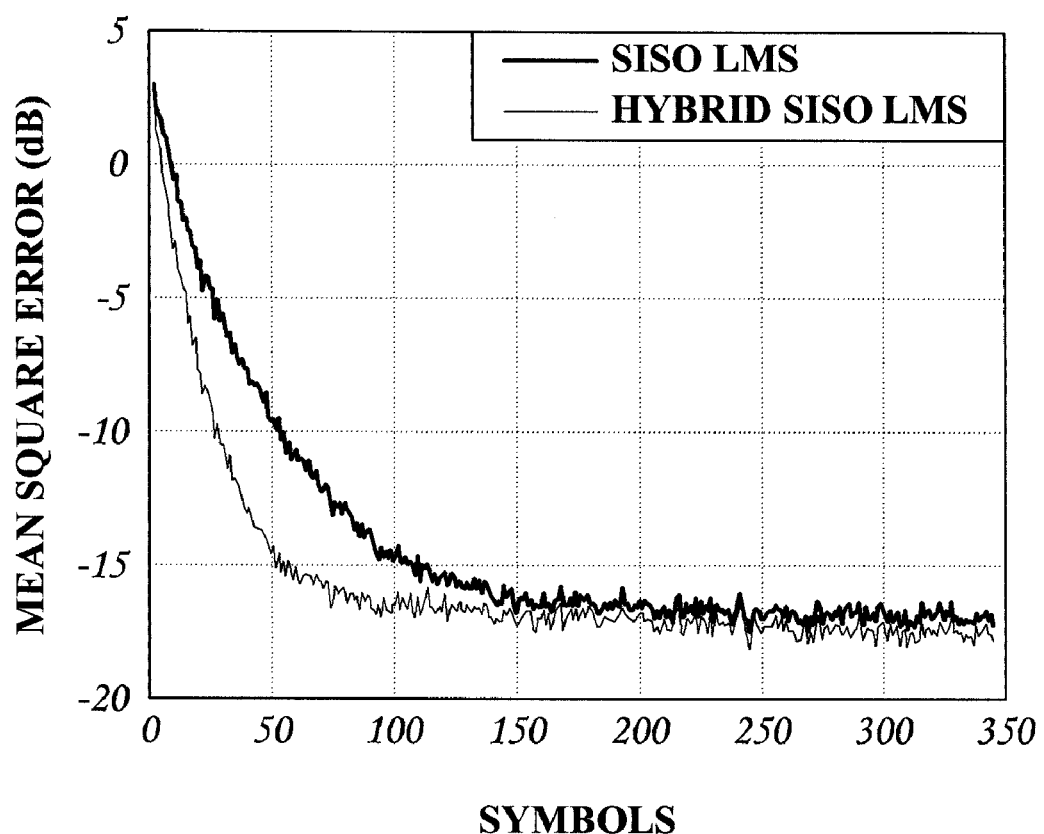

FIGS. 7A and 7B are graphs illustrating simulation results comparing performances of a SISO equalizer in a conventional art and a hybrid equalizer according to an exemplary embodiment of the present invention in a fixed channel.

FIG. 7A illustrates a simulation result when an SNR is 10 dB. FIG. 7B illustrates a simulation result when an SNR is 30 dB. In the present simulation, the SISO equalizer in the conventional art runs a general LMS algorithm, and the hybrid equalizer according to an exemplary embodiment of the present invention runs the above-described CE-LMS algorithm.

It is shown that the hybrid equalizer running the CE-LMS algorithm according to an exemplary embodiment of the present invention converges faster than the SISO equalizer in the conventional art running the general LMS algorithm in FIGS. 7A and 7B.

Figure 8A:
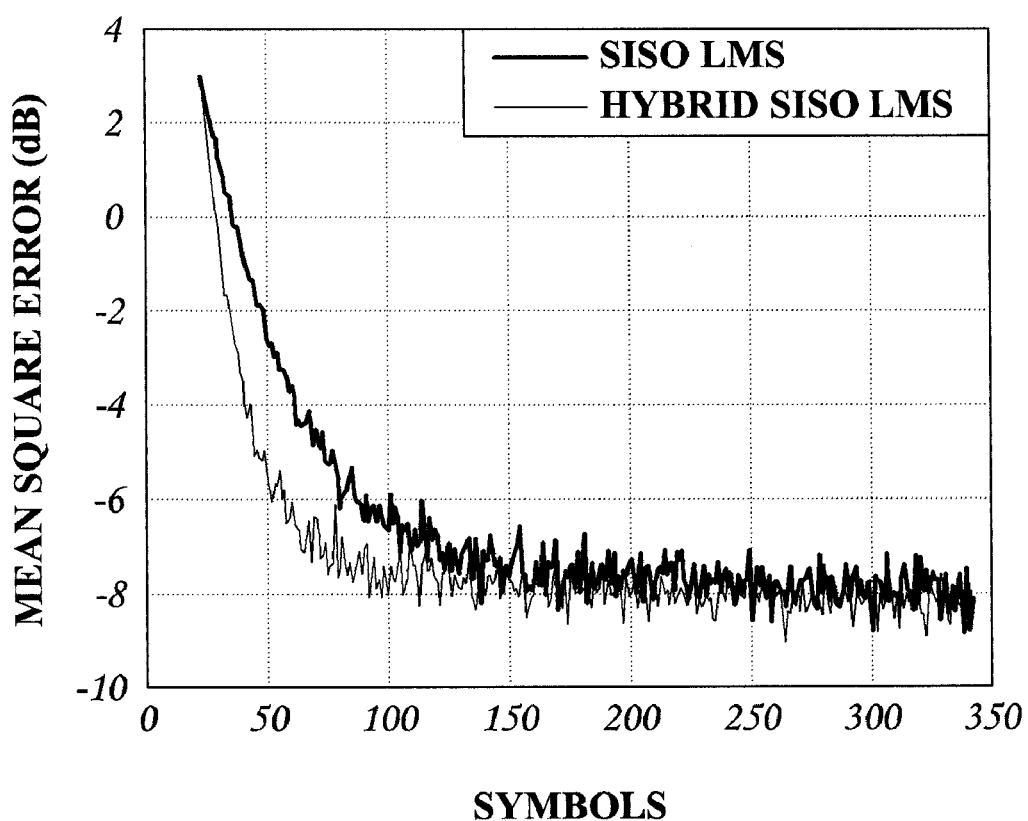
FIGS. 8A and 8B are graphs illustrating simulation results comparing performances of a SISO equalizer in a conventional art and a hybrid equalizer according to an exemplary embodiment of the present invention in a mobile channel.
Figure 8B:
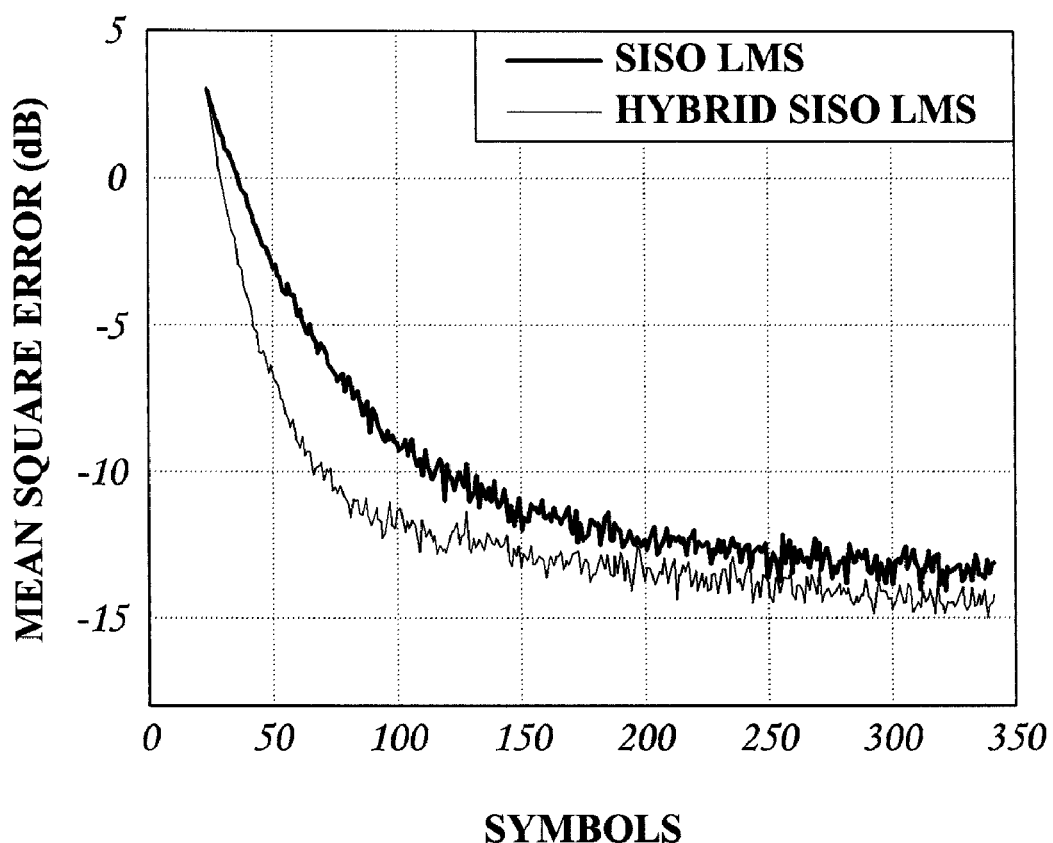

FIGS. 8A and 8B are graphs illustrating simulation results comparing performances of a SISO equalizer in a conventional art and a hybrid equalizer according to an exemplary embodiment of the present invention in a mobile channel.

FIG. 8A illustrates a simulation result when an SNR is 10 dB. FIG. 8B illustrates a simulation result when an SNR is 30 dB. In the present simulation, the SISO equalizer in the conventional art runs a general LMS algorithm, and the hybrid equalizer according to an exemplary embodiment of the present invention runs the above-described CE-LMS algorithm.

It is shown that, in the mobile channel, the hybrid equalizer running the CE-LMS algorithm according to an exemplary embodiment of the present invention converges faster than the SISO equalizer in the conventional art running the general LMS algorithm in FIGS. 8A and 8B.

Figure 9A:
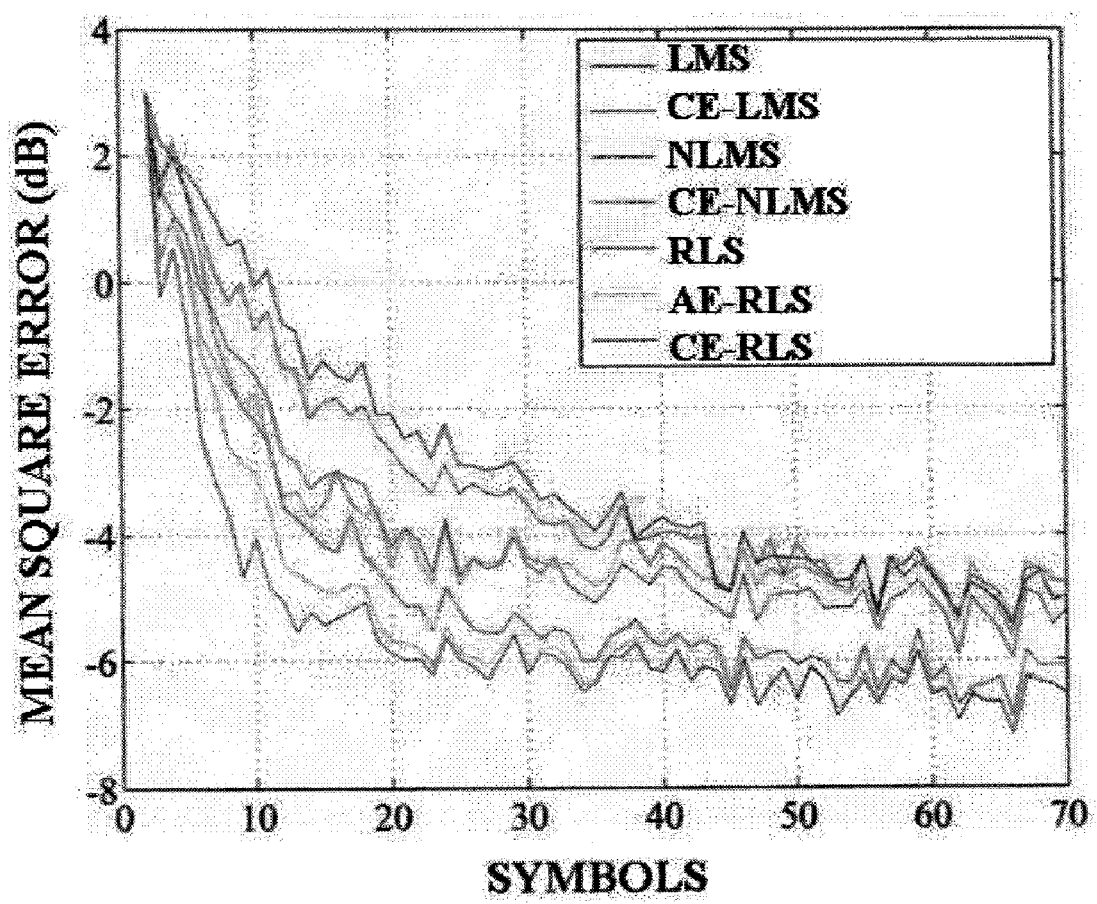
FIGS. 9A and 9B are graphs illustrating simulation results comparing performances of a general algorithm in a conventional art and a hybrid algorithm according to an exemplary embodiment of the present invention in a fixed channel.
Figure 9B:
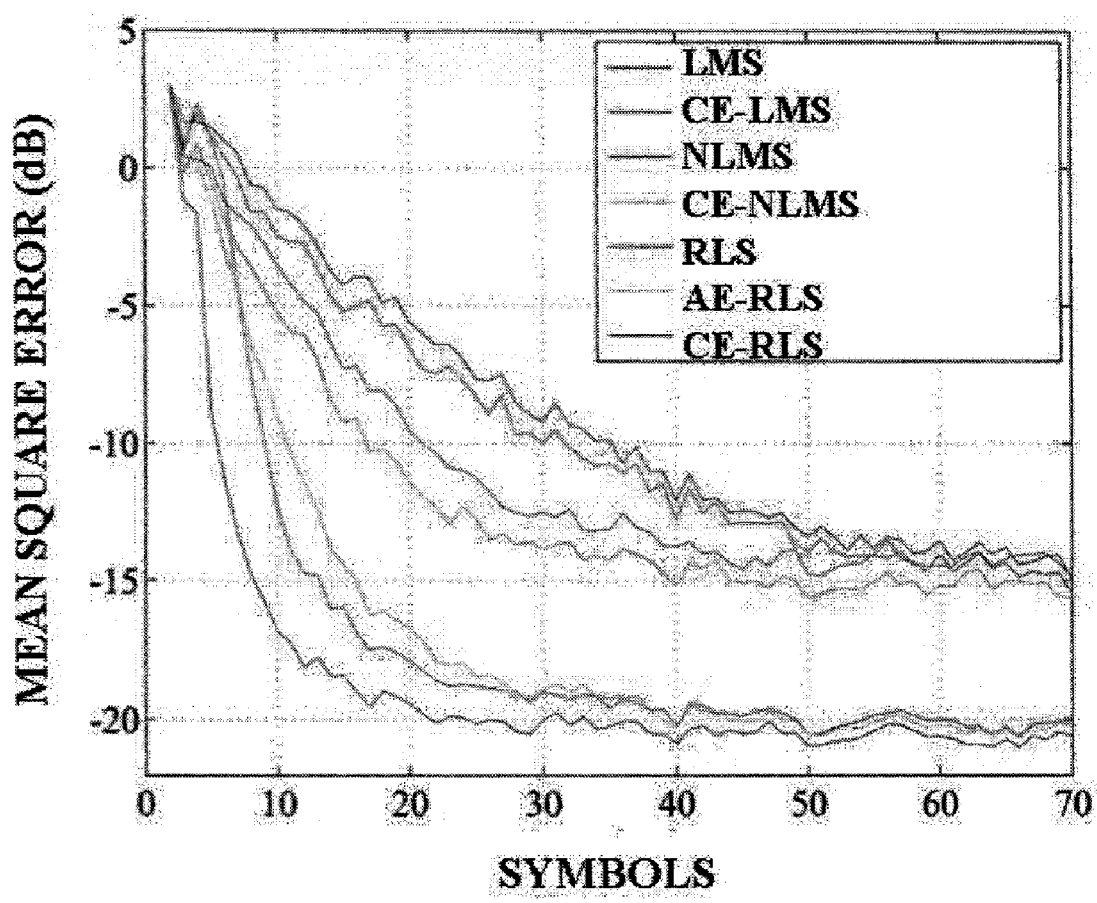

FIGS. 9A and 9B are graphs illustrating simulation results comparing performances of a general algorithm in a conventional art and a hybrid algorithm according to an exemplary embodiment of the present invention in a fixed channel.

FIG. 9A illustrates a simulation result when an SNR is 5 dB. FIG. 9B illustrates a simulation result when an SNR is 30 dB.

With reference to FIGS. 9A and 9B, a CE-LMS algorithm in an exemplary embodiment of the present invention converges faster than a general LMS algorithm in the conventional art, and a CE-NLMS algorithm in an exemplary embodiment of the present invention converges faster than an NLMS algorithm in the conventional art. Also, an AE-RLS and CE-RLS algorithm in an exemplary embodiment of the present invention converge faster than an RLS algorithm in the conventional art. Accordingly, it is shown that the hybrid algorithm may converge faster than the general algorithm in the conventional art.

Also, it is shown that the CE-LMS algorithm performs almost as well as the CE-NLMS algorithm without extra divisions. Also, it is shown that the CE-RLS algorithm performed as a most effective algorithm of all SNRs in FIG. 9A and FIG. 9B.

Figure 10A:
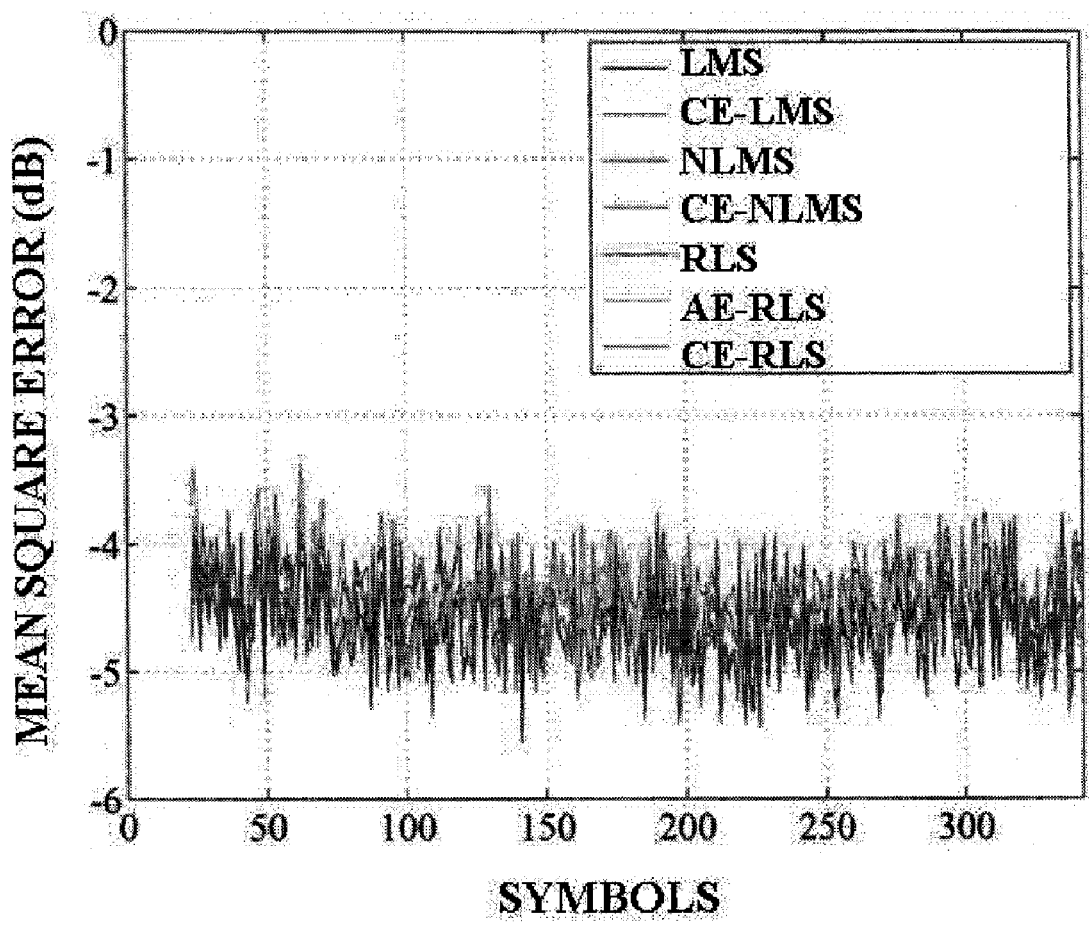
FIGS. 10A and 10B are graphs illustrating simulation results comparing performances of a general algorithm in a conventional art and a hybrid algorithm according to an exemplary embodiment of the present invention in a mobile channel.
Figure 10B:
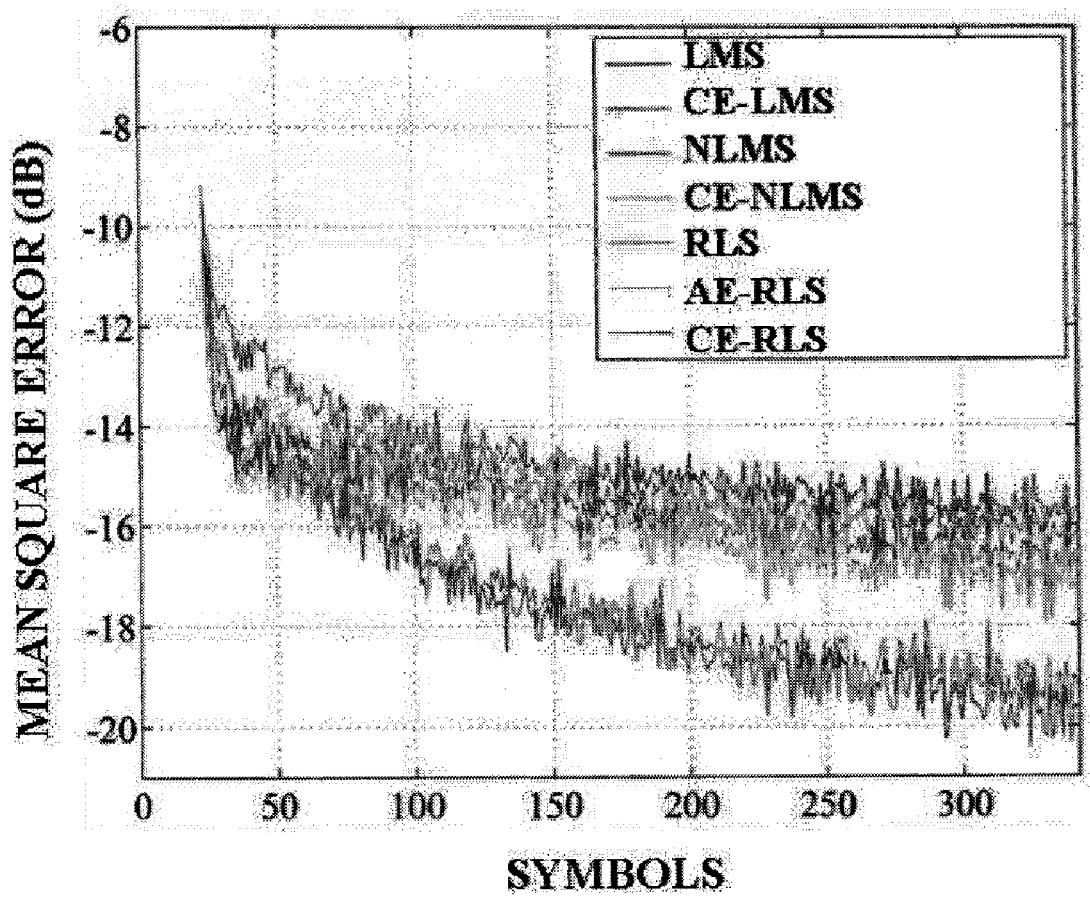

FIGS. 10A and 10B are graphs illustrating simulation results comparing performances of a general algorithm in a conventional art and a hybrid algorithm according to an exemplary embodiment of the present invention in a mobile channel.

FIG. 10A illustrates a simulation result when an SNR is 5 dB. FIG. 10B illustrates a simulation result when an SNR is 30 dB. A weight of a subsequent packet is initialized using a final equalizer tap weight from a single packet.

In FIG. 10A, it is shown that no significant difference between algorithms exists in a low SNR.

In FIG. 10B, it is shown that the hybrid algorithm may converge faster than the general algorithm in the conventional art, and the CE-RLS algorithm performed as a most effective algorithm in a high SNR.

Figure 11A:
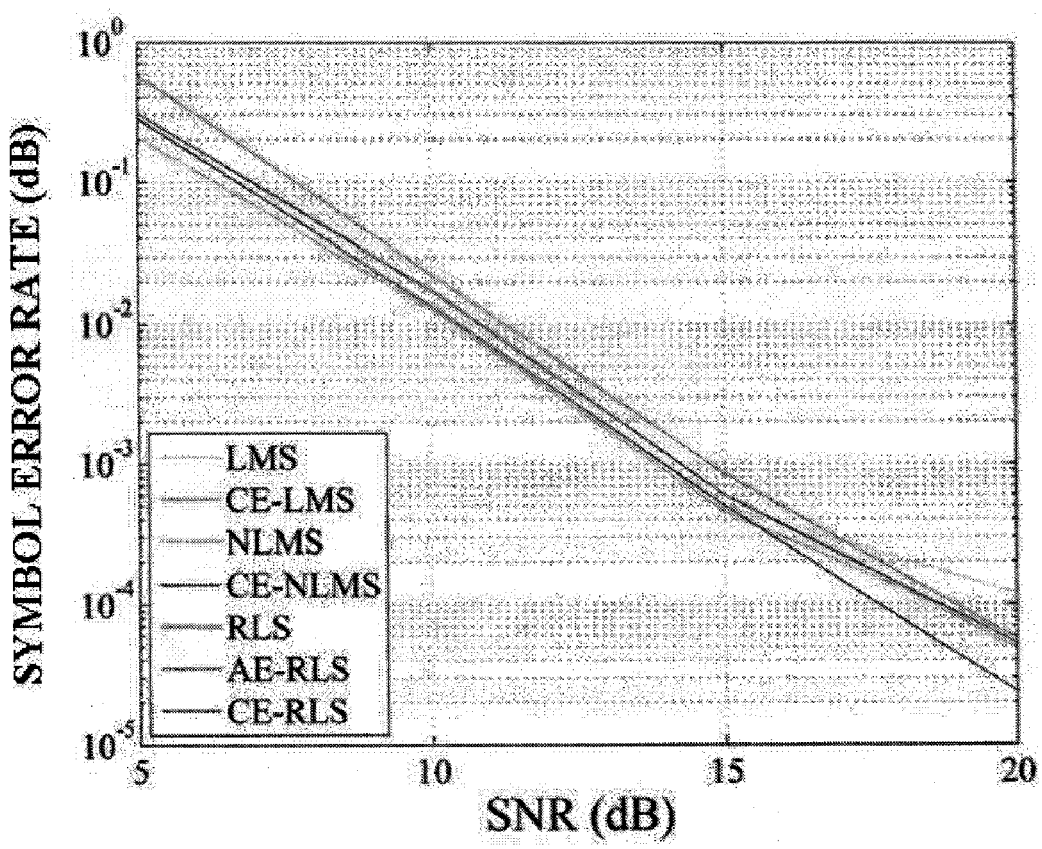
FIGS. 11A and 11B are graphs illustrating simulation results comparing a steady-state performance of a DFE for each algorithm in a mobile channel.
Figure 11B:
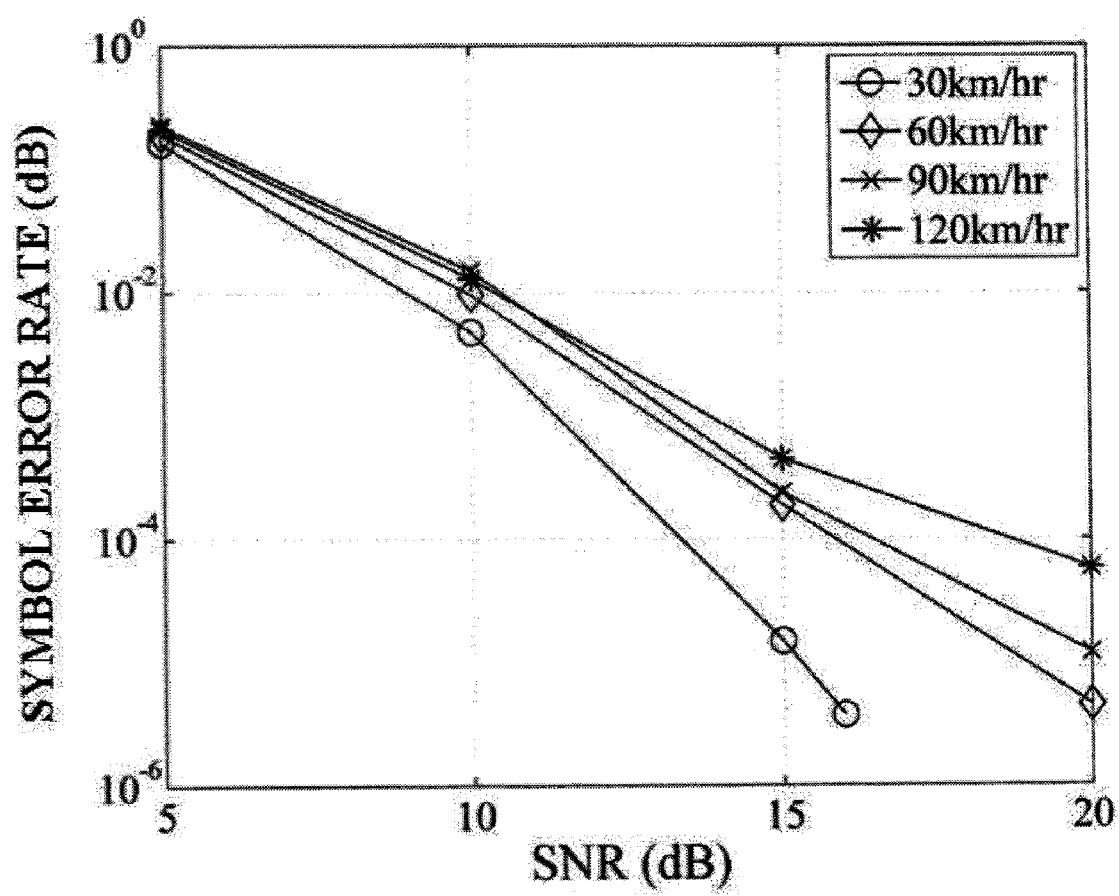

FIGS. 11A and 11B are graphs illustrating simulation results comparing a steady-state performance of a DFE for each algorithm in a mobile channel.

FIG. 11A illustrates a simulation result in a maximum vehicle speed of 120 km/h. FIG. 11B illustrates a simulation result of a CE-LMS algorithm depending on a change caused by a Doppler Effect.

In FIG. 11A, it is shown that a small steady-state difference between various algorithms exists in a fixed Doppler.

In FIG. 11B, it is shown that the CE-LMS algorithm is optimally performed for a least computational complexity. Also, it is shown that as the Doppler spread increases, a symbol error rate (SER) of the CE-LMS algorithm generally decreases.

Figure 12A:
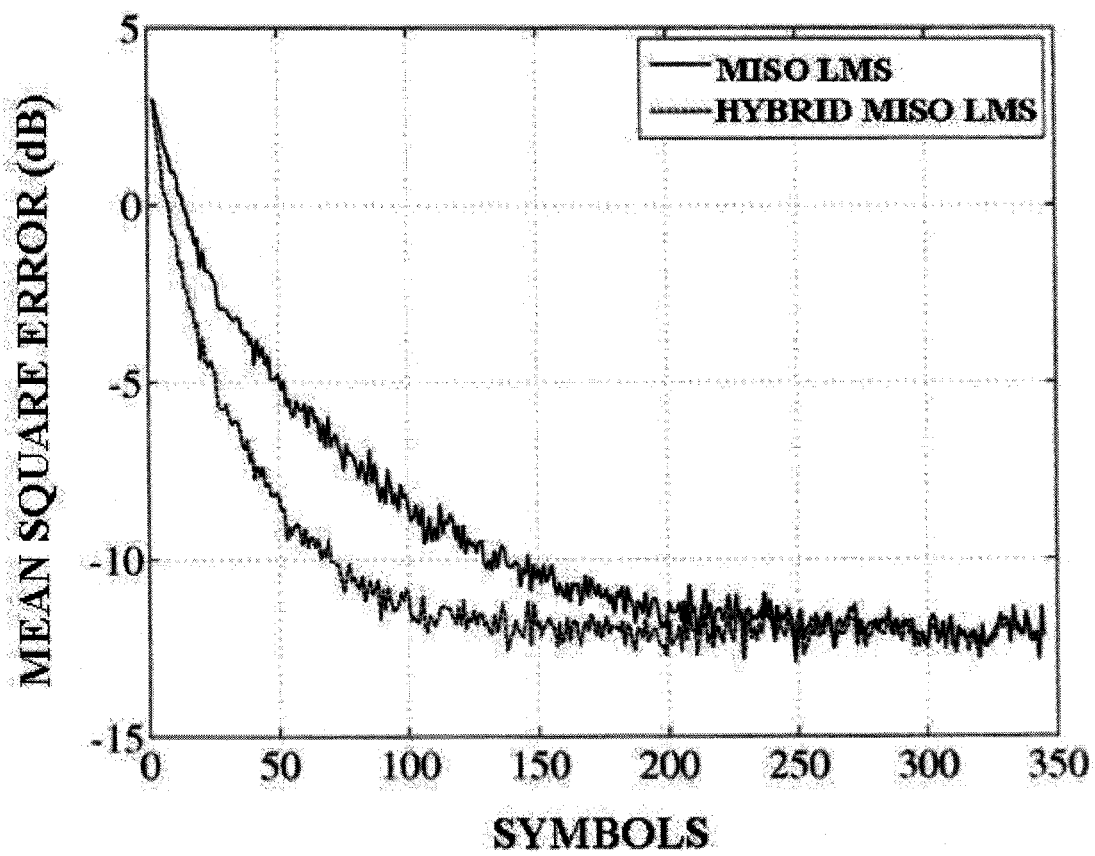
FIGS. 12A and 12B are graphs illustrating simulation results comparing performances of 2×2 MISO DFE configuration for receive (RX) diversity.
Figure 12B:
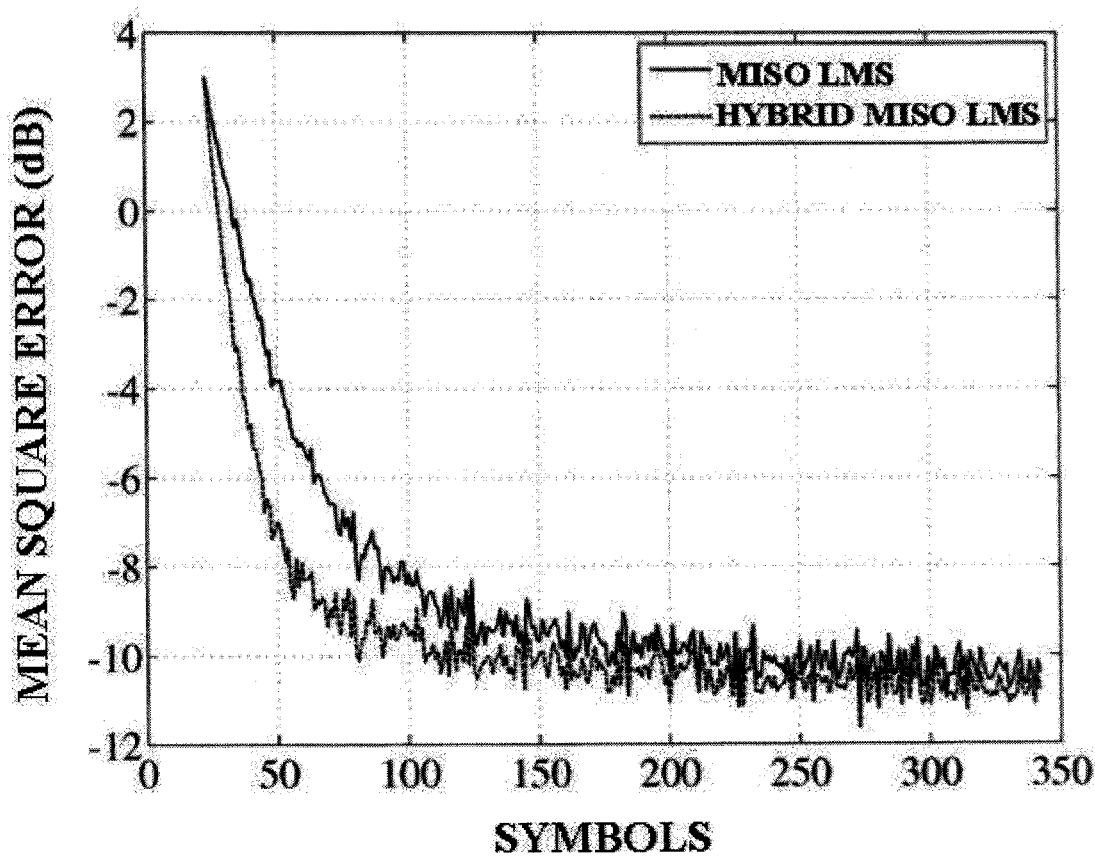

FIGS. 12A and 12B are graphs illustrating simulation results comparing performances of 2×2 MISO DFE configuration in a receive (RX) diversity.

FIG. 12A illustrates a simulation result in a fixed channel. FIG. 12B illustrates a simulation result in a mobile channel. In both FIGS. 12A and 12B, an SNR is 10 dB. In the present simulation, a MISO equalizer in a conventional art runs a general LMS algorithm, and a hybrid MISO equalizer according to an exemplary embodiment of the present invention runs a CE-LMS algorithm described above.

In FIGS. 12A and 12B, it is shown that, in both channels, the hybrid MISO equalizer running the CE-LMS algorithm converges faster than the MISO equalizer in the conventional art running the general LMS algorithm.

Figure 13A:
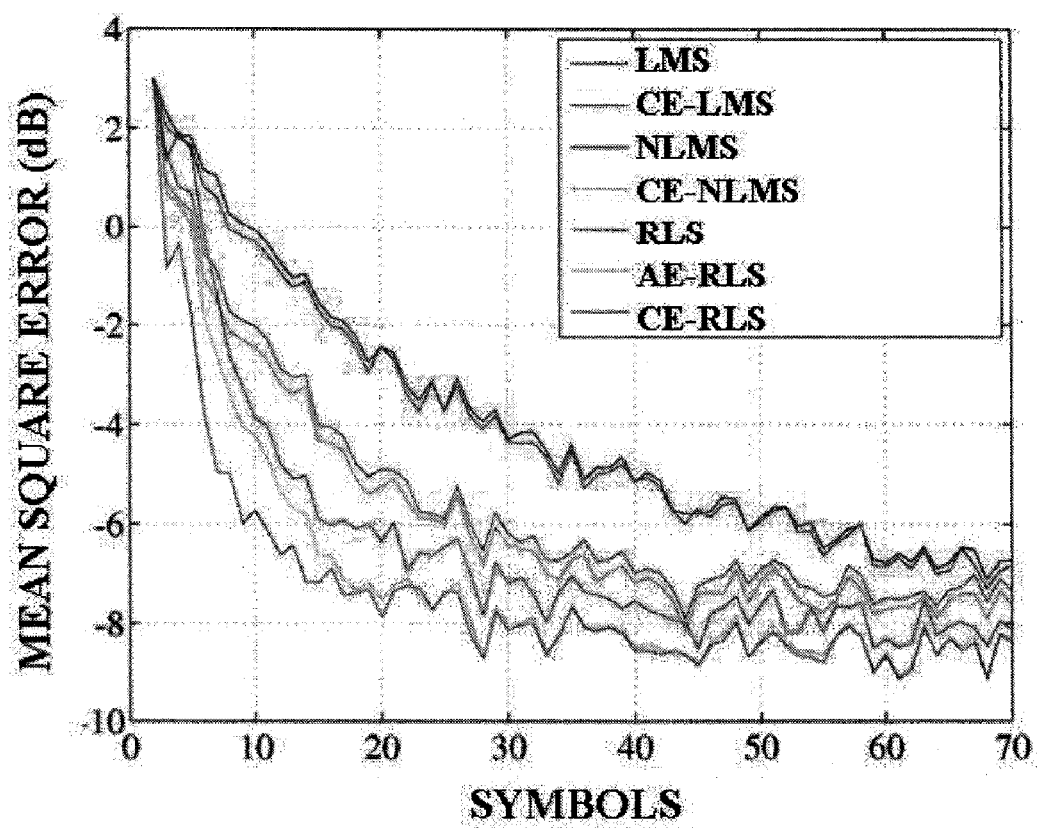
FIGS. 13A and 13B are graphs illustrating simulation results comparing performances of a general algorithm in a conventional art and a hybrid algorithm according to an exemplary embodiment of the present invention in a fixed channel, when each algorithm is applied to a 2×2 MISO DFE configuration.
Figure 13B:
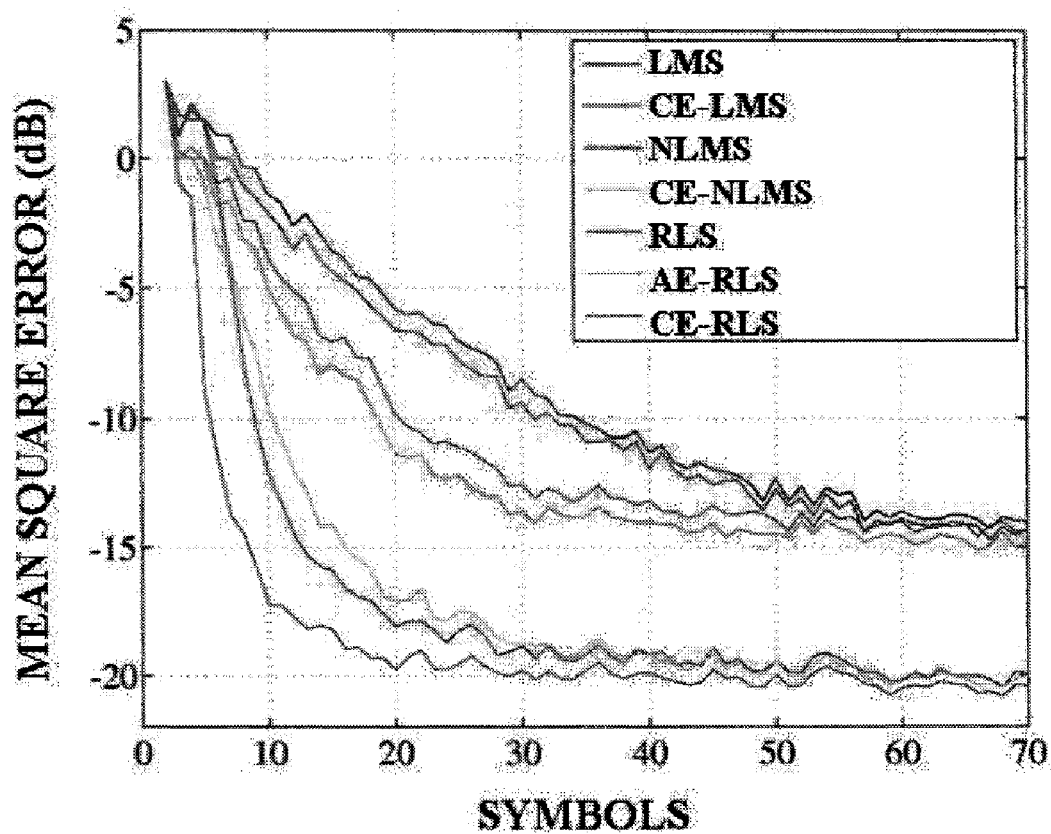

FIGS. 13A and 13B are graphs illustrating simulation results comparing performances of a general algorithm in a conventional art and a hybrid algorithm according to an exemplary embodiment of the present invention in a fixed channel when each algorithm is respectively applied to a 2×2 MISO DFE configuration.

FIG. 13A illustrates a simulation result when an SNR is 5 dB. FIG. 13B illustrates a simulation result when an SNR is 30 dB.

In FIGS. 13A and 13B, it is shown that a CE-LMS algorithm in an exemplary embodiment of the present invention converges faster than a general LMS algorithm in the conventional art, and a CE-NLMS algorithm in an exemplary embodiment of the present invention converges faster than an NLMS algorithm in the conventional art. Also, an AE-RLS and CE-RLS algorithm in an exemplary embodiment of the present invention converge faster than an RLS algorithm in the conventional art. Accordingly, it is shown that, in the 2×2 MISO DFE configuration, the hybrid algorithm may converge faster than the general algorithm in the conventional art.

Also, in the 2×2 MISO DFE configuration, it is shown that the CE-LMS algorithm performs almost as well as the CE-NLMS algorithm without extra divisions. Also, it is shown that the CE-RLS algorithm performed as a most effective algorithm of all SNRs in FIG. 13A and FIG. 13B.

Figure 14A:
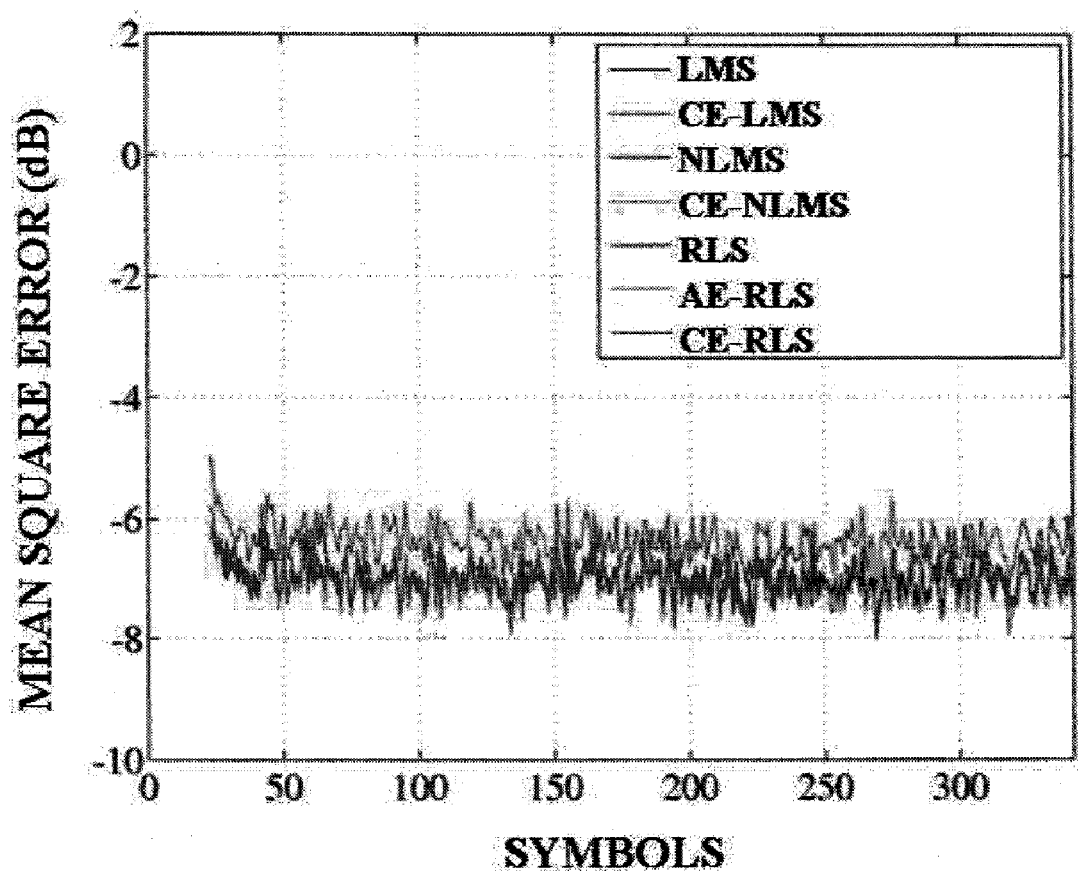
FIGS. 14A and 14B are graphs illustrating simulation results comparing performances of a general algorithm in a conventional art and a hybrid algorithm according to an exemplary embodiment of the present invention in a mobile channel, when each algorithm is applied to a 2×2 MISO DFE configuration.
Figure 14B:
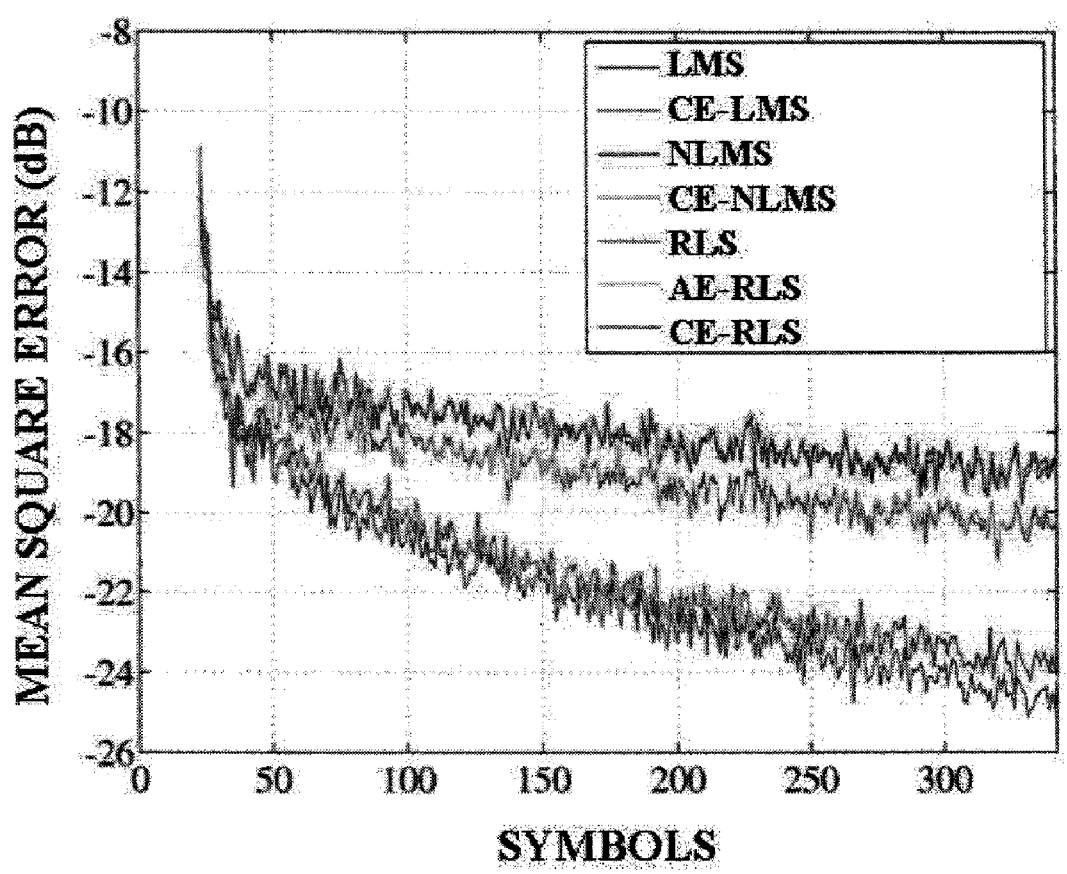

FIGS. 14A and 14B are graphs illustrating simulation results comparing performances of a general algorithm in a conventional art and a hybrid algorithm according to an exemplary embodiment of the present invention in a mobile channel, when each algorithm is respectively applied to a 2×2 MISO DFE configuration.

FIG. 14A illustrates a simulation result when an SNR is 5 dB. FIG. 14B illustrates a simulation result when an SNR is 30 dB. A weight of a subsequent packet is initialized using a final equalizer tap weight from a single packet.

In FIG. 14A, in the 2×2 MISO DFE configuration, it is shown that no significant difference between algorithms exists in a low SNR.

In FIG. 14B, in the 2×2 MISO DFE configuration, it is shown that the hybrid algorithm may converge faster than the general algorithm in the conventional art, and the CE-RLS algorithm performed as a most effective algorithm in a high SNR.

According to the present invention, a gradient noise associated with a stochastic gradient-based algorithm such as an LMS and an NLMS may be reduced by applying an additional constraint on an equalizer using second-order statistical information.

Also, according to the present invention, there is provided a hybrid algorithm with a lower steady-state MSE than an algorithm in a conventional art, and with an increased MSE convergence speed due to a decrease in a gradient noise.

Also, according to the present invention, there is provided a hybrid DFE configuration used in a TR-STBC system and with a reduced complexity, and also an adaptive algorithm based on a CE-LMS algorithm, a CE-NLMS algorithm, an AE-RLS algorithm, and a CE-RLS algorithm is provided for the hybrid DFE configuration.

Also, according to the present invention, there is provided a new hybrid equalizer configuration in which two SISO (or MISO) DFEs have the same tap weights and share statistical information with each other by using same second-order statistics of two output streams outputted from a TR-STBC decoder to the two SISO (or MISO) DFEs.

Also, according to the present invention, there is provided a hybrid DFE configuration used in a TR-STBC system, and thus a complexity is significantly reduced in comparison with a conventional maximum likelihood sequence estimator, and a real time operation may be simply performed.

Also, according to the present invention, an error algorithm, combined with a new hybrid equalizer configuration which promotes an increased equalizer convergence speed instead of a parallel SISO equalizer using a conventional algorithm, is used and thus a training sequence is reduced and a bandwidth efficiency of a system is improved.

Also, according to the present invention, when an RX antennal is introduced, a fast convergence speed is maintained and an RX diversity feature may be used using a new hybrid MISO equalizer configuration using a hybrid algorithm.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A hybrid equalizer, comprising:
a first single-input single-output (SISO) Decision Feedback Equalizer (DFE) which receives and processes a first output stream from a time reversal-space time block code (TR-STBC) decoder; and
a second SISO DFE which receives and processes a second output stream from the TR-STBC decoder,
wherein the first SISO DFE and the second SISO DFE share error information with each other.

2. The hybrid equalizer of claim 1, wherein the first output stream and the second output stream have the same second-order statistical information.

3. The hybrid equalizer of claim 2, wherein the first SISO DFE and the second SISO DFE share the error information with each other to have an equal tap weight using the second-order statistical information.

4. The hybrid equalizer of claim 3, wherein the error information of the first SISO DFE and the second SISO DFE is combined.

5. The hybrid equalizer of claim 4, wherein the first SISO DFE and the second SISO DFE use a combined error-Least Mean Square (CE-LMS) algorithm to combine the error information, and the CE-LMS algorithm is represented as, $$\overline{w}(k+1) = \overline{w}(k) + \mu[e_{1k}^* v_1(k) + e_{2k}^* v_2(k)]$$
$$e_{1k} = s_{1,k-\delta} - \overline{w}^H(k)v_1(k)$$
$$e_{2k} = s_{2,k-\delta} - \overline{w}^H(k)v_2(k)$$

6. The hybrid equalizer of claim 4, wherein the first SISO DFE and the second SISO DFE use a combined error-normalized LMS (CE-NLMS) algorithm to combine the error information, and the CE-NLMS algorithm is represented as, $$\overline{w}(k+1) = \overline{w}(k) + \frac{\mu_o}{\|v_1(k)\|^2 + \delta} e_{1k}^* v_1(k) + \frac{\mu_o}{\|v_2(k)\|^2 + \delta} e_{2k}^* v_2(k)$$
$$e_{1k} = s_{1,k-\delta} - \overline{w}^H(k)v_1(k) \quad e_{2k} = s_{2,k-\delta} - \overline{w}^H(k)v_2(k).$$

7. The hybrid equalizer of claim 4, wherein the first SISO DFE and the second SISO DFE use an averaged estimate-Recursive Least Square (AE-RLS) algorithm to combine the error information, and an initial condition of the AE-RLS algorithm is $$w_{AE}(0) = 0$$
$$P_{AE}(0) = \delta^{-1} I$$

and uses an equation to update a tap weight at each iteration, the equation being represented as, $$\pi_1(k) = P_{AE}(k-1)v_1(k)$$
$$\pi_2(k) = P_{AE}(k-1)v_2(k)$$
$$k_1(k) = \frac{\pi_1(k)}{\lambda + v_1^H(k)\pi_1(k)}$$
$$k_2(k) = \frac{\pi_2(k)}{\lambda + v_2^H(k)\pi_2(k)}$$
$$\epsilon_{1k} = s_{1,k-\delta} - w_{AE}^H(k-1)v_1(k)$$
$$\epsilon_{2k} = s_{2,k-\delta} - w_{AE}^H(k-1)v_2(k)$$
$$w_{AE}(k) = w_{AE}(k-1) + \frac{1}{2}[k_1(k)\epsilon_{1k}^* + k_2(k)\epsilon_{2k}^*]$$
$$P_{AE}(k) = \lambda^{-1} P_{AE}(k-1) - \frac{1}{2\lambda}[k_1(k)v_1^H(k) + k_2(k)v_2^H(k)] P_{AE}(k-1).$$

8. The hybrid equalizer of claim 4, wherein the first SISO DFE and the second SISO DFE use a combined estimate-RLS (CE-RLS) algorithm to combine the error information, and an initial condition of the CE-RLS algorithm is $$w_{CE}(0) = 0$$
$$P_{CE}(0) = \delta^{-1} I$$

and uses an equation to update a tap weight at each iteration, the equation being represented as, $$\prod(k) = P_{CE}(k-1)V(k) \text{ where } V(k) = [v_1(k)v_2(k)]$$
$$K(k) = \prod(k)[\lambda I_2 + V^H(k)\prod(k)]^{-1}$$
$$\epsilon(k) = s(k) - V^T(k)w_{CE}^*(k-1) \text{ where } s(k) = [s_{1,k-\delta} s_{2,k-\delta}]^T$$
$$w_{CE}(k) = w_{CE}(k-1) + K(k)\epsilon^*(k)$$
$$P_{CE}(k) = \lambda^{-1} P_{CE}(k-1) - \lambda^{-1} K(k)V^H(k) P_{CE}(k-1).$$

9. A hybrid equalizer, comprising:
a first multiple-input single-output (MISO) Decision Feedback Equalizer (DFE) which receives and processes a first output stream from a plurality of TR-STBC decoders; and
a second MISO DFE which receives and processes a second output stream from the plurality of TR-STBC decoders,
wherein the first MISO DFE and the second MISO DFE share error information with each other.

10. The hybrid equalizer of claim 9, wherein the first output stream and the second output stream have the same second-order statistical information, and the first MISO DFE and the second MISO DFE share the error information with each other to have an equal tap weight using the second-order statistical information.

11. The hybrid equalizer of claim 10, wherein the error information of the first MISO DFE and the second MISO DFE is combined.

12. The hybrid equalizer of claim 11, wherein the first MISO DFE and the second MISO DFE use a CE-LMS algorithm to combine the error information, and the CE-LMS algorithm is represented as, $$\overline{w}(k+1) = \overline{w}(k) + \mu[e_{1k}^* v_1(k) + e_{2k}^* v_2(k)]$$
$$e_{1k} = s_{1,k-\delta} - \overline{w}^H(k)v_1(k)$$
$$e_{2k} = s_{2,k-\delta} - \overline{w}^H(k)v_2(k).$$

13. The hybrid equalizer of claim 11, wherein the first MISO DFE and the second MISO DFE use a CE-NLMS algorithm to combine the error information, and the CE-NLMS algorithm is represented as, $$\overline{w}(k+1) = w(k) + \frac{\mu_o}{\|v_1(k)\|^2 + \delta} e_{1k}^* v_1(k) + \frac{\mu_o}{\|v_2(k)\|^2 + \delta} e_{2k}^* v_2(k)$$
$$e_{1k} = s_{1,k-\delta} - \overline{w}^H(k)v_1(k)$$
$$e_{2k} = s_{2,k-\delta} - \overline{w}^H(k)v_2(k).$$

14. The hybrid equalizer of claim 11, wherein the first MISO DFE and the second MISO DFE use an AE-RLS algorithm to combine the error information, and an initial condition of the AE-RLS algorithm is $$w_{AE}(0) = 0$$
$$P_{AE}(0) = \delta^{-1}I$$

and uses an equation to update a tap weight at each iteration, the equation being represented as, $$\pi_1(k) = P_{AE}(k-1)v_1(k)$$
$$\pi_2(k) = P_{AE}(k-1)v_2(k)$$
$$k_1(k) = \frac{\pi_1(k)}{\lambda + v_1^H(k)\pi_1(k)}$$
$$k_2(k) = \frac{\pi_2(k)}{\lambda + v_2^H(k)\pi_2(k)}$$
$$\epsilon_{1k} = s_{1,k-\delta} - w_{AE}^H(k-1)v_1(k)$$
$$\epsilon_{2k} = s_{2,k-\delta} - w_{AE}^H(k-1)v_2(k)$$
$$w_{AE}(k) = w_{AE}(k-1) + \frac{1}{2}[k_1(k)\epsilon_{1k}^* + k_2(k)\epsilon_{2k}^*]$$
$$P_{AE}(k) = \lambda^{-1}P_{AE}(k-1) - \frac{1}{2\lambda}[k_1(k)v_1^H(k) + k_2(k)v_2^H(k)]P_{AE}(k-1).$$

15. The hybrid equalizer of claim 11, wherein the first MISO DFE and the second MISO DFE use a CE-RLS algorithm to combine the error information, and an initial condition of the CE-RLS algorithm is $$w_{CE}(0) = 0$$
$$P_{CE}(0) = \delta^{-1}I$$

and uses an equation to update a tap weight at each iteration, the equation being represented as, $$\Pi(k) = P_{CE}(k-1)V(k) \text{ where } V(k) = [\,v_1(k)\ \ v_2(k)\,]$$
$$K(k) = \Pi(k)[\lambda I_2 + V^H(k)\Pi(k)]^{-1}$$
$$\epsilon(k) = s(k) - V^T(k)w_{CE}^*(k-1) \text{ where } s(k) = [\,s_{1,k-\delta}\ \ s_{2,k-\delta}\,]^T$$
$$w_{CE}(k) = w_{CE}(k-1) + K(k)\epsilon^*(k)$$
$$P_{CE}(k) = \lambda^{-1}P_{CE}(k-1) - \lambda^{-1}K(k)V^H(k)P_{CE}(k-1)$$

\* \* \* \* \*